(12) United States Patent
Huynh et al.

(10) Patent No.: US 8,996,903 B2
(45) Date of Patent: Mar. 31, 2015

(54) SYSTEM AND METHOD FOR POWERING A TIMER USING A LOW CURRENT LINEAR REGULATOR DURING HIBERNATE MODE WHILE DISABLING A SWITCHING POWER SUPPLY ASSOCIATED WITH POWERING A PROCESSOR RESPONSIBLE FOR SETTING A HIBERNATE ENABLE BIT

(71) Applicants: Steven Huynh, Fremont, CA (US); Hue Khac Trinh, Hanoi (VN)

(72) Inventors: Steven Huynh, Fremont, CA (US); Hue Khac Trinh, Hanoi (VN)

(73) Assignee: Active-Semi, Inc. (VG)

( * ) Notice: Subject to any disclaimer, the term of this patent is extended or adjusted under 35 U.S.C. 154(b) by 359 days.

(21) Appl. No.: 13/712,900

(22) Filed: Dec. 12, 2012

(65) Prior Publication Data

US 2014/0164803 A1 Jun. 12, 2014

(51) Int. Cl.
 *G06F 1/26* (2006.01)
 *G06F 1/32* (2006.01)

(52) U.S. Cl.
 CPC ............ *G06F 1/3206* (2013.01); *G06F 1/3287* (2013.01); *Y02B 60/1282* (2013.01)
 USPC .......................................................... 713/323

(58) Field of Classification Search
 CPC ..... G06F 1/3234; G06F 1/3287; G06F 1/3206
 USPC .......................................................... 713/323
 See application file for complete search history.

(56) References Cited

U.S. PATENT DOCUMENTS

| | | | |
|---|---|---|---|
| 5,455,503 A | * | 10/1995 | Kohler ........................... 323/273 |
| 7,395,443 B1 | * | 7/2008 | Kromer et al. ................. 713/324 |
| 8,909,956 B2 | * | 12/2014 | Zhuang et al. ................. 713/320 |

* cited by examiner

*Primary Examiner* — Mark Connolly
*Assistant Examiner* — Siamak S Hefazi
(74) *Attorney, Agent, or Firm* — Imperium Patent Works; T. Lester Wallace; Amir V. Adibi

(57) ABSTRACT

A Multi-Tile Power Management Integrated Circuit (MTPMIC) includes tiles including an MCU/ADC tile and a power manager tile. The power manager tile includes a hibernate circuit and a set of Configurable Switching Power Supply Pulse Width Modulator (CSPSPWM) components. The CSPSPWM, in combination with other circuitry external to the integrated circuit, form a switching power supply. The hibernate circuit is operable in a hibernate mode where the CSPSPWM is disabled and the switching power supply no longer generates a supply voltage. A processor in the MCU/ADC tile writes across a standardized bus to configure the hibernate circuit to wake up after a timer determines a configurable amount of time has lapsed, or to wake up in response to a signal present on a terminal of MTPMIC. The processor enables the hibernate mode causing the switching power supply to no longer provide power to the processor and other circuitry of MTPMIC.

22 Claims, 22 Drawing Sheets

MTPMIC INTEGRATED CIRCUIT

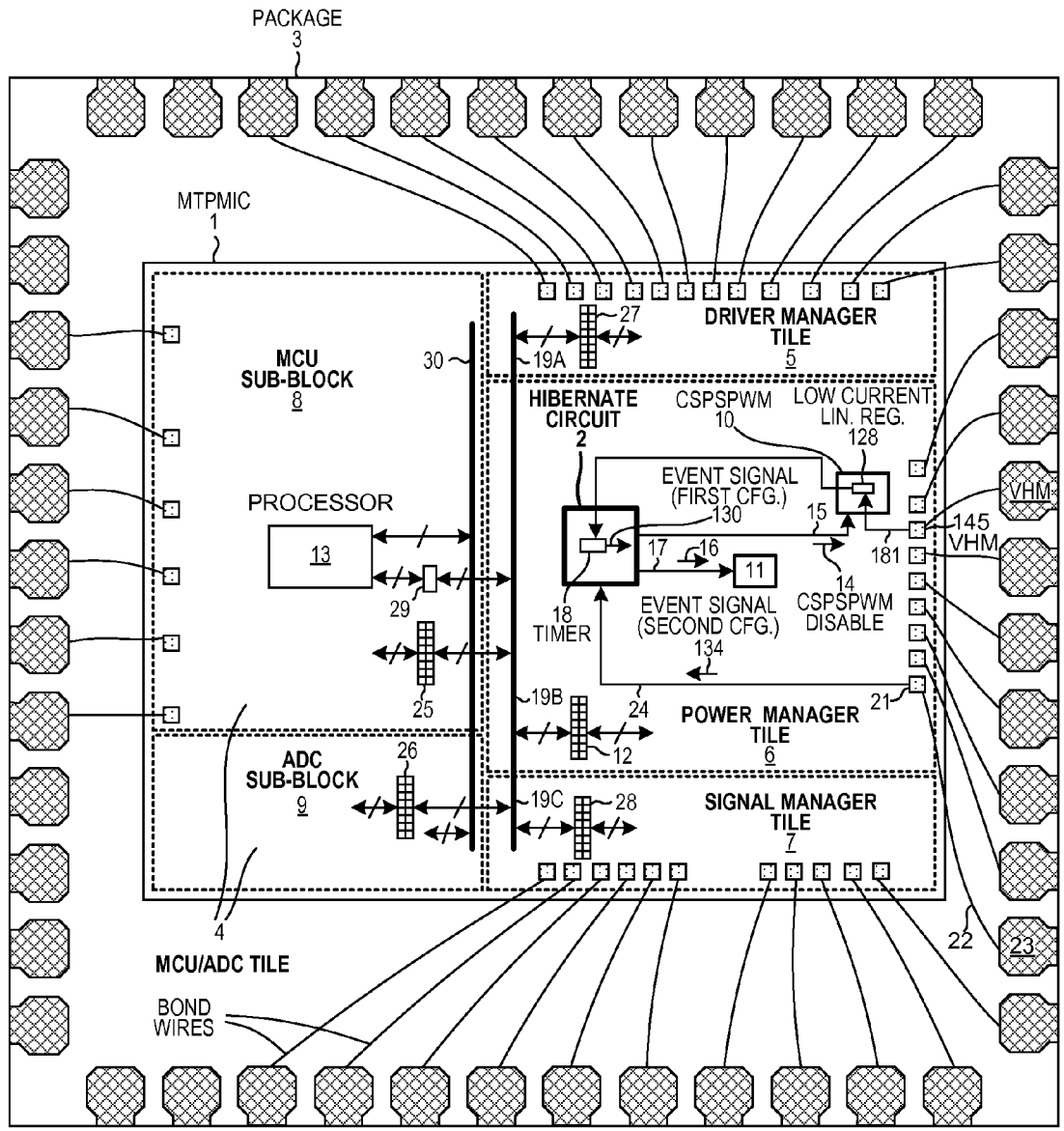
MTPMIC INTEGRATED CIRCUIT
FIG. 1
KEY TO FIG. 2
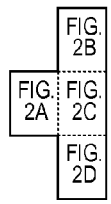

HIBERNATE CIRCUIT IN THE FIRST CONFIGURATION

HIBERNATE CIRCUIT IN THE SECOND CONFIGURATION

| HIBERNATE CIRCUIT CONFIGURATION | | |
|---|---|---|
| CONFIGURATION BIT | VALUE | DESCRIPTION |
| HIBERNATE | 0 OR 1 | HIBERNATE MODE ENABLE BIT |
| PUSHBUTTON | 0 OR 1 | ENABLE PUSH BUTTON EXIT |
| TIMER<2:0> | 0H TO 7H | SET HIBERNATE TIMER DURATION |
| PUSHBUTTONSTATUS | 0 OR 1 | PUSHBUTTON EVENT DETECTED |
| PUSHBUTTONINT | 0 OR 1 | ENABLE INTERRUPT |

CONFIGURATION REGISTER BITS OF
HIBERNATE CIRCUIT

HIGH VOLTAGE STEP DOWN

FLYBACK

SYSTEM AND METHOD FOR POWERING A TIMER USING A LOW CURRENT LINEAR REGULATOR DURING HIBERNATE MODE WHILE DISABLING A SWITCHING POWER SUPPLY ASSOCIATED WITH POWERING A PROCESSOR RESPONSIBLE FOR SETTING A HIBERNATE ENABLE BIT

TECHNICAL FIELD

The present disclosure relates generally to power management integrated circuits, and more particularly to reducing power consumed by power management integrated circuits.

BACKGROUND INFORMATION

There are a many varieties of microcontroller integrated circuits that are useable in power switching and power control applications. Existing microcontrollers typically involve a processor along with relatively simple general purpose input/output terminals and perhaps an Analog-to-Digital Converter (ADC) and/or a Digital-to-Analog Converter (DAC). To use such a microcontroller in the overall power control system, some sort of power supply is generally necessary to generate a supply voltage from which power can then be used or switched under control of the microcontroller. The circuitry of the microcontroller itself also must be powered from a DC supply voltage. The power supply is to supply power to the overall system as well as to the microcontroller circuitry. In most applications, it is desirable for the power control system and the microcontroller to operate in a fashion that consumes as little power as possible. Ways to reduce power consumption in such microcontroller based power switching systems are desired.

SUMMARY

A Multi-Tile Power Management Integrated Circuit (MTPMIC) includes a plurality of Power Management Integrated Circuit (PMIC) tiles. In one example, these PMIC tiles include an MCU/ADC tile, a driver manager tile, a power manager tile, and a signal manager tile. The power manager tile includes a set of configurable pulse width modulator components referred to as the Configurable Switching Power Supply Pulse Width Modulator (CSPSPWM). The CSPSPWM is configured along with external components (external to the MTPMIC) to form a switching power supply. The switching power supply generates a supply voltage that is used to power circuitry of the MTPMIC.

The power manager tile includes a hibernate circuit. The hibernate circuit is operable in a hibernate mode that disables the CSPSPWM. When the CSPSPWM is disabled, the switching power supply no longer generates the supply voltage and circuitry of the MTPMIC is disabled. The power manager tile includes an always-on low current linear regulator that continues to supply power to a minimal amount of circuitry within the hibernate circuit, such as a timer. This minimal amount of circuitry is used to disable the hibernate mode when the hibernate circuit is in the hibernate mode.

A processor within the MCU/ADC tile configures the hibernate circuit and enables the hibernate mode. The processor configures the hibernate circuit in one of two configurations that determines how the hibernate mode is disabled after being enabled. The processor configures the hibernate circuit by writing configuration information to a configuration register of the power manager tile over a standardized bus. The processor configures the hibernate circuit prior to enabling the hibernate mode. The processor enables the hibernate mode by setting a hibernate mode enable bit of the configuration register to a digital logic high value. After the hibernate mode is enabled, the hibernate circuit will remain in the hibernate mode until an event signal causes the hibernate mode to be disabled.

In the first configuration, the event signal is generated by the timer that is part of the hibernate circuit. The timer generates the event signal an amount of time after the hibernate mode is enabled. The amount of time that the hibernate mode remains enabled is configured by the processor prior to enabling the hibernate mode. The processor configures this amount of time by writing a digital value to the configuration register of the power manager tile. After the event signal is generated, the timer supplies the event signal to a hibernate logic block within the hibernate circuit. The hibernate logic block sets the hibernate mode enable bit to a digital logic low value. After the hibernate mode is disabled, the MTPMIC enters a startup mode and the processor is powered.

In the second configuration, the event signal is received onto a terminal of the MTPMIC. The event signal is generated off-chip and is supplied onto the terminal. For example, the event signal is generated by an external push-button. An event detect block of the hibernate circuit detects whether the event signal is present on the terminal. If the event detect block determines than an event detect signal was received on the terminal, then the event detect block controls the hibernate logic block to set the hibernate mode enable bit to a digital logic low value. After the hibernate mode is disabled, the MTPMIC enters a startup mode and the processor is powered.

The foregoing is a summary and thus contains, by necessity, simplifications, generalizations and omissions of detail; consequently is it appreciated that the summary is illustrative only. Still other methods, and structures and details are set forth in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 1 is a simplified top-down conceptual diagram of a Multi-Tile Power Management Integrated Circuit (MTPMIC) 1 that includes a hibernate circuit 2.

DETAILED DESCRIPTION

Figure 2A:
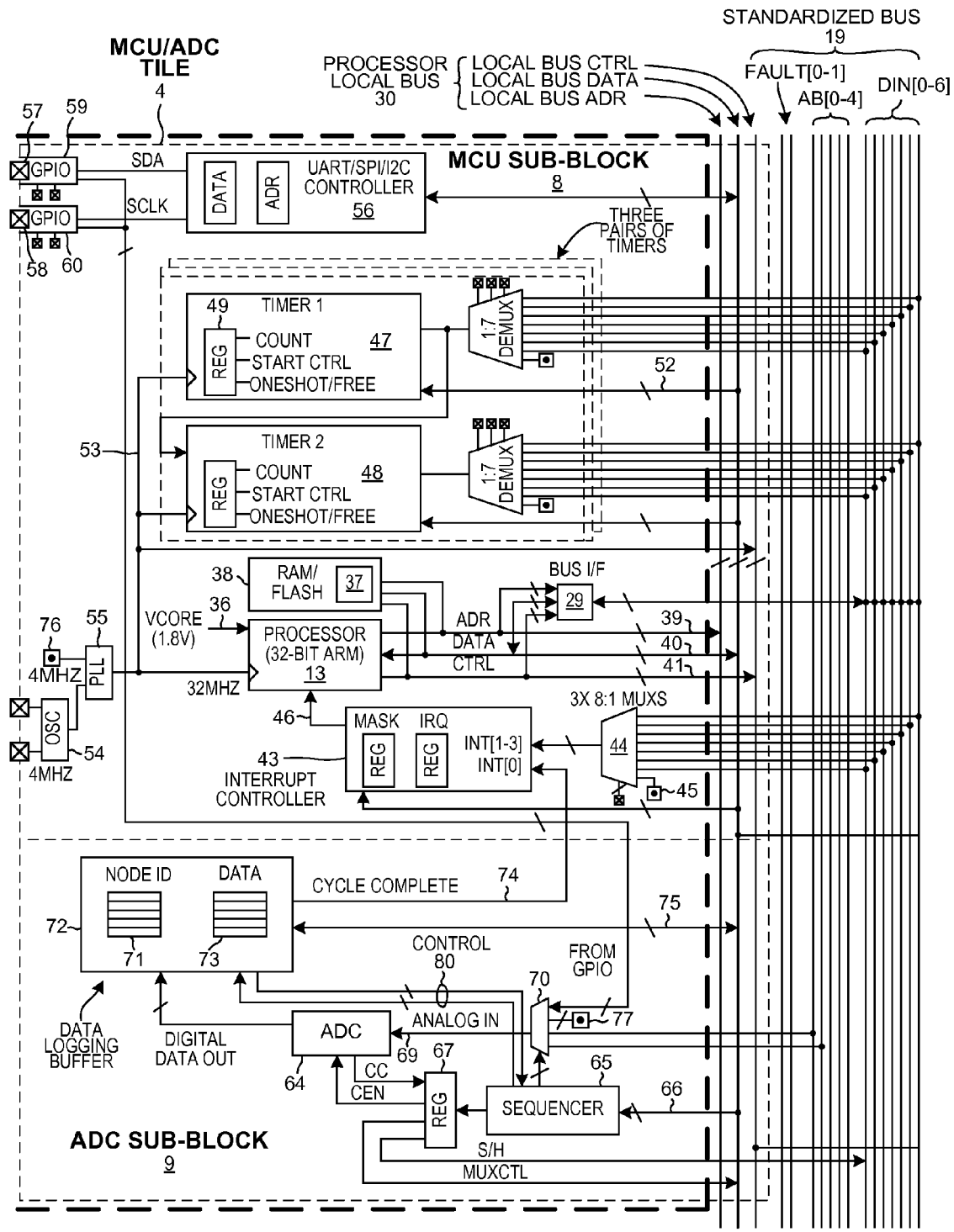
FIG. 2 comprises FIGS. 2A, 2B, 2C and 2D which together are a circuit diagram of the MTPMIC 1 of FIG. 1.

FIG. 1 is a simplified top-down conceptual diagram of a Multi-Tile Power Management Integrated Circuit (MTPMIC) 1 that includes a hibernate circuit 2. Hibernate circuit 2 is operable in a hibernate mode that disables nearly all power generating circuitry within MTPMIC 1 reducing the power consumption of the MTPMIC 1. MTPMIC 1 is the rectangular integrated circuit die within integrated circuit package 3. Integrated circuit package 3 includes a row of terminals on each of its four sides. The MTPMIC 1 comprises multiple Power Management Integrated Circuit (PMIC) tile portions. These PMIC tile portions include the MCU/ADC tile 4, a driver manager tile 5, a power manager tile 6, and a signal manager tile 7. The MCU/ADC tile 4 includes an MCU (microcontroller unit) sub-block 8 and an Analog-to-Digital converter (ADC) sub-block 9. The hibernate circuit 2 is a part of the power manager tile 6.

The power manager tile 6 receives power from an external power source and outputs supply voltages that satisfy all the power needs of the MTPMIC 1. The power manager tile 6 includes the hibernate circuit 2, a set of configurable pulse width modulator components referred to as the Configurable Switching Power Supply Pulse Width Modulator (CSPSPWM) 10, linear regulator circuitry 11, and a configuration register 12. The CSPSPWM 10 is configured along with external components (external to the MTPMIC 1) to form a switching power supply. The switching power supply generates a supply voltage that is supplied to the linear regulator circuitry 11 and other circuitry (not shown). The linear regulator circuitry 11 receives the supply voltage generated by the switching power supply and supplies power to processor 13 within the MCU/ADC tile 4. Configuration information stored in the configuration register 12 determines how the CSPSPWM 10 is configured. Accordingly, the power manager tile 6 is configurable in different ways along with circuitry external to the MTPMIC 1 to realize a selected one of a number of switching power supplies circuits such as: a step down converter, a high voltage step down converter, a flyback converter, and a boost converter.

The hibernate circuit 2 generates digital logic control signals that enable and disable the CSPSPWM 10 and the linear regulator circuitry 11. The hibernate circuit 2 generates a digital logic signal CSPSPWM DISABLE 14 and supplies the CSPSPWM DISABLE signal 14 to the CSPSPWM 10 via conductor 15. The hibernate circuit 2 also generates a digital logic signal LR DISABLE 16 and supplies the LR DISABLE signal 16 to the linear regulator circuitry 11 via conductor 17. If the hibernate mode is enabled, then the hibernate circuit 2 controls the CSPSPWM DISABLE signal 14 to disable the CSPSPWM 10 and controls the LR DISABLE signal 16 to disable the linear regulator circuitry 11. Alternatively, if the hibernate mode is disabled, then the hibernate circuit 2 controls the CSPSPWM DISABLE signal 14 to enable the CSPSPWM 10 and controls the LR DISABLE signal 16 to enable the linear regulator circuitry 11.

When the hibernate circuit 2 is operating in the hibernate mode, the switching power supply no longer generates the supply voltage causing power to be cut to the processor 13 and almost all circuitry of the MTPMIC 1. Only a minimal amount of circuitry continues to operate when the hibernate mode is enabled. For example, in one embodiment, an always-on low current linear regulator 128 within the CSPSPWM 10 supplies a low current supply voltage of approximately twenty microamps to timer 18 within the hibernate circuit 2. The low current linear regulator 128 is supplied by a current directly from the power source via terminal VHM 145 and package terminal VHM. Aside from the timer 18 and other minimal amount of circuitry within the hibernate circuit 2 that continues to consume power in the hibernate mode, all other circuitry is disabled. As a result, the MTPMIC 1 consumes at most three-hundred microamps of current when the hibernate mode is enabled. Because the MTPMIC 1 is unpowered in the hibernate mode, the hibernate mode is also referred to as a "total hibernate mode".

A hibernate mode enable bit determines whether the hibernate mode is enabled or disabled. The hibernate mode enable bit is one bit of the configuration register 12. Processor 13 of the MCU/ADC tile 4 sets the hibernate mode enable bit by writing to the configuration register 12 across standardized bus 19. In addition to the hibernate mode enable bit, the configuration register 12 includes a plurality of hibernate mode configuration bits. Prior to enabling the hibernate mode, the processor 13 configures these hibernate mode configuration bits. By appropriately setting the hibernate mode configuration bits, the processor 13 can configure the hibernate circuit 2 in one of two configurations that determines the manner in which the hibernate mode is disabled after being enabled (also referred to as "wake up").

After the hibernate mode enable bit is set by processor 13 causing the hibernate mode to be enabled, the hibernate circuit 2 remains in the hibernate mode until an event signal causes the hibernate mode to be disabled. If the processor 13 configures the hibernate circuit 2 in the first configuration, then the hibernate circuit 2 remains in the hibernate mode until an event signal 130 is generated by the timer 18. For example, prior to setting the hibernate mode enable bit such that the hibernate mode is enabled, the processor 13 configures the hibernate circuit to disable the hibernate mode after a selectable amount of time. After the hibernate mode is enabled under the first configuration, the timer generates an event signal after the timer determines that the amount of time has lapsed causing the hibernate mode to be disabled.

If, on the other hand, the processor 13 configures the hibernate circuit 2 in the second configuration, then the hibernate circuit 2 remains in the hibernate mode until an event signal 134 is received onto a terminal of the MTPMIC 1. For example, prior to setting the hibernate mode enable bit such that the hibernate mode is enabled, the processor 13 configures the hibernate circuit to disable the hibernate mode after an event signal is received onto terminal (also referred to as a pad) 21 of MTPMIC 1. Terminal 21 is an event signal terminal because it is configured to receive the external event signal. In the diagram of FIG. 1, reference numeral 22 identifies a bond wire that couples terminal 23 of the package 3 to the event signal terminal 21. After the hibernate mode is enabled under the second configuration, the hibernate mode remains enabled until the event signal 134 is received onto package terminal 23, onto event signal terminal 21 via bond wire 22, and onto hibernate circuit 2 via conductor 24 causing the hibernate mode to be disabled.

Standardized bus 19 comprises a plurality of bus portions (19A-19C) of conductors each capable of conducting digital signals, analog signals, and power signals. Bus portion 19A is the bus portion of driver manager tile 5. Bus portion 19B is the bus portion of power manager tile 6. Bus portion 19C is the bus portion of signal manager tile 7. The bus portions are disposed within each tile as illustrated so that if the tiles are appropriately arrayed in a column, then the bus portions of adjacent tiles line up with one another and form the standardized bus 19. In the illustrated example, the standardized bus 19 extends vertically along the left edge of the driver manager tile, vertically along the left edge of the power manager tile, and vertically along the left edge of the signal manager tile. The MCU/ADC tile 4 on the left interfaces to this standardized bus 19 in a standardized way using configuration registers 25 and 26. Each of the PMIC tiles in the right column also has such a configuration register coupled to the standardized bus. Configuration register 27 is the configuration register of driver manager tile 5. Configuration register 12 is the configuration register of power manager tile 6. Configuration register 28 is the configuration register of signal manager tile 7.

The processor 13 within MCU/ADC tile 4 is the master of standardized bus 19. Through a bus interface 29, the processor 13 can write to any of the configuration registers in any of the tiles across the standardized bus. For additional information on the tile architecture, the standardized bus, and its associated configuration registers, see: 1) U.S. Pat. No. 7,788,608, entitled "Microbump Function Assignment In A Buck Converter," filed Oct. 29, 2007, by Huynh et al.; 2) U.S. Pat. No. 7,581,198, entitled "Method and System for the Modular Design and Layout of Integrated Circuits," filed Oct. 7, 2006, by Huynh et al.; 3) U.S. provisional application 60/850,359, entitled "Single-Poly EEPROM Structure For Bit-Wise Write/Overwrite," filed Oct. 7, 2006; 4) U.S. Pat. No. 7,869,275, entitled "Memory Structure Capable of Bit-Wise Write or Overwrite," filed Jul. 31, 2007, by Grant et al.; 5) U.S. Pat. No. 7,904,864, entitled "Interconnect Layer of a Modularly Designed Analog Integrated Circuit," filed Oct. 29, 2007, by Huynh et al.; 6) U.S. patent application Ser. No. 11/452,713, entitled "System for a Scaleable and Programmable Power Management Integrated Circuit," filed Jun. 13, 2006, by Huynh; and 7) U.S. provisional application Ser. No. 60/691,721, entitled "System for a Scaleable and Programmable Power Management Integrated Circuit", filed Jun. 16, 2005, by Huynh (the entire subject matter of each of these patent documents is incorporated herein by reference).

In addition to the standardized bus 19, MTPMIC 1 also includes a processor local bus 30. Various circuits in MCU sub-block 8 and in ADC sub-block 9 are coupled to this processor local bus 30. Processor 13 can read to these various circuits across the processor local bus 30 and processor 13 can also write to these various circuits across the processor local bus 30.

FIGS. 2A, 2B, 2C and 2D fit together to form a larger diagram of FIG. 2. A key showing how FIGS. 2A, 2B, 2C and 2D fit together in this way is provided below and to the right of FIG. 1. Standardized bus 19 includes data bus lines DIN[0-6], clock strobe conductors (not shown), uncommitted digital signal conductors (not shown), other committed digital conductors (not shown), uncommitted analog signal conductors AB[0-4], committed analog conductors (not shown), fault conductors FAULT[0-1], global clock conductors (not shown), ground and voltage reference conductors (not shown), as well as other conductors. Processor local bus 30 includes an address bus LOCAL BUS ADR, a data bus LOCAL BUS DATA, and control signal lines LOCAL BUS CTRL. Due to space limitations in the drawings, only some of the conductors of the standardized bus 19 and only some of the conductors of the processor local bus 30 are illustrated. For further details regarding the structure and operation of MTPMIC 1, see: U.S. patent application Ser. No. 13/315,282, entitled "Power Manager Tile For Multi-Tile Power Management Integrated Circuit", filed Dec. 8, 2011, by Huynh (the entire subject matter of this patent document is incorporated herein by reference).

MCU/ADC Tile

FIG. 2A is a simplified diagram of MCU/ADC tile 4. MCU/ADC tile 4 includes the processor 13, as well as the numerous other blocks pictured. In the specific example illustrated, the vertically extending conductors of the standardized bus 19 do not extend through the MCU/ADC tile 4 but rather extend vertically just outside the right edge of tile 4. The configuration registers 25 and 26 (see FIG. 1) and other circuitry interfaces to these vertically extending bus conductors of standardized bus 19.

A program of processor-executable instructions 37 can be loaded into MTPMIC 1, can be stored into RAM/FLASH memory block 38, and can be executed by processor 13. RAM/FLASH block 38 represents data and program memory for processor 13. RAM/FLASH memory block 38 is a processor-readable medium that is accessible across processor local bus 30. Processor 13 accesses the processor local bus 30 via conductors 39, 40 and 41 as shown. The arrow 36 labeled VCORE indicates that the processor is entirely powered from the VCORE supply voltage. The VCORE supply voltage is generated by a linear regulator in the power manager tile 6 (see FIG. 2C) and is supplied to MCU/ADC tile 4 via a power supply conductor (not shown) of the standardized bus 19. When powered from this VCORE supply voltage, processor 13 can write to the configuration registers 25 and 26 across the standardized bus 19 via bus interface block 29. When the hibernate mode is enabled, the processor is no longer powered by the VCORE supply voltage.

If processor 13 is to write data into a particular configuration register, then processor 13 writes the data to be written into bus interface block 29. Bus interface block 29 puts the data onto the DIN[0-6] data lines of the standardized bus 19. The processor 13 then writes an address into bus interface block 29. This address identifies which configuration register it is that is to be written. By using the bus interface block 29, processor 13 can write configuration information across the standardized bus 19 into any one of the configuration registers of the MTPMIC 1.

In the diagrams, an individual bit of a configuration register is represented by a small square surrounding an X. The memory cells of these individual configuration bits are not spread across the circuitry of the tile as illustrated, but rather are located together in what is referred to as a configuration register. Some of these configuration bits are located in MCU/ADC tile 4 but they are written across the standardized bus in the same way that they would be written were they located in another PMIC tile.

MCU/ADC tile 4 also includes an interrupt controller 43. Three programmable 8:1 multiplexers 44 are provided so that a signal from a selectable one of the data lines of the standardized bus can be supplied to the interrupt controller 43 to serve as an interrupting signal. In an actual design, the data input leads coupled to multiplexers 44 are coupled not to DIN[0-6] but rather are coupled to uncommitted digital conductors of the standardized bus. There is not adequate room in the diagram of FIG. 2A to show these uncommitted digital conductors so the input multiplexers 44 to the interrupt controller is shown coupled to DIN[0-6]. Which signal from the standardized bus it is that is supplied onto which of the three interrupt input leads INT[1-3] of the interrupt controller is freely programmable by processor 13 by setting the configuration bits that control the select inputs of multiplexer 44. In this example, hibernate circuit 2 is configured to supply an interrupt signal HIBERNATE INT onto interrupt controller 43 (see FIG. 2C). The interrupt signal HIBERNATE INT indicates whether an event signal is received onto the hibernate circuit and the hibernate mode should be enabled.

One of the data input leads of each of the 8:1 multiplexers 44 is coupled to what is referred to here as a "minipad". The symbol for a minipad in the diagrams is a dot surrounded by a square. Reference numeral 45 identifies one such minipad. Such a minipad can be coupled by a direct point-to-point uppermost metal layer conductor or bond wire to another minipad on the integrated circuit. In this way, in the present design, the three minipads of the three multiplexers 44 are coupled directly to minipads located in the signal manager tile 7 so that the signals coupled to interrupt controller input leads INT[1-3] are taken from three corresponding event signal detector circuits. The event signal detector circuits are described in further detail below. As illustrated in FIG. 2A, interrupt controller input lead INT[0] is hardwired to receive the CYCLE COMPLETE signal from the ADC sub-block 9 as shown. Interrupt controller 43 supplies an interrupt request signal via conductor 46 to processor 13. Processor 13 can read and write the MASK and IRQ registers of the interrupt controller in standard interrupt controller fashion across processor local bus 30.

MCU/ADC tile 4 also includes three pairs of timers. Timers 47 and 48 are a first such pair. Each timer is operable in a one-shot mode or in a free running PWM mode, depending on the value of a corresponding ONE SHOT/FREE bit in the control register of the timer. Reference numeral 49 identifies the control register for TIMER1 47. Processor 13 can start TIMER1 47 by writing to a START CTRL bit in register 49. Processor 13 can read and write to control register 49 of TIMER1 47 across the processor local bus 30 via interconnections 52. Each of the pairs of timers is coupled to the processor local bus 30 in a similar fashion.

The time base by which the timers increment is a clock signal provided on conductor 53. This is the same clock signal that clocks processor 13. In one example, a 4 MHz signal generated by an oscillator 54 and an external crystal (not shown) is increased in frequency by a Phase-Locked Loop (PLL) 55 up to 32 MHz, thereby generating the clock signal that clocks the processor. In another example, the oscillator 54 is not used, but rather a 4 MHz clock signal received via minipad 76 is used by PLL 55 as an input signal to generate the clock signal. Minipad 76 may be connected via a metal layer conductor or wire bonded to a corresponding minipad in the power manager tile 6 where a 4 MHz clock signal generated by a 4 MHz internal oscillator is present.

MCU/ADC tile 4 also includes an UART/SPI/I2C controller block 56. Processor 13 can read and write to the DATA and ADR registers of UART/SPI/I2C controller block 56 via processor local bus 30. By writing to and reading from the DATA and ADR registers in an appropriate fashion, processor 13 controls the receiving and transmitting of data across GPIO terminals 57 and 58 using the UART or SPI or I2C protocol.

Each GPIO terminal is part of an associated GPIO block. GPIO block 59 is the GPIO block of which GPIO terminal 57 is a part. GPIO block 60 is the GPIO block of which GPIO terminal 58 is a part. Each GPIO block can be configured in a selected one of various ways depending on the values of two configuration bits associated with the GPIO block. Processor 13 can write these configuration bits across the standardized bus 19.

ADC sub-block 9 includes an Analog-to-Digital Converter (ADC) 64 and a sequencer 65. The sequence of operations carried out by sequencer 65 is controlled by processor 13 by writing control values into sequencer 65 across the processor local bus via interconnections 66. Sequencer 65 can write to an ADC control register 67. Setting bit CEN of register 67 enables and starts the ADC 64 performing an analog-to-digital conversion. When the conversion is complete, the ADC 64 communicates this status back to sequencer 65 by writing a digital high value into the CC bit of ADC control register 67. The signal manager tile 7 includes sample and hold circuits for sampling voltage signals on certain nodes. The sequencer 65 can cause these sample and hold circuits to perform a sample operation by setting a S/H bit in ADC control register 67. Sequencer 65 can also control which one of multiple signals will be supplied onto the ANALOG IN input lead 69 of ADC 64 for conversion. This control is provided by multiplexer 70. Multiplexer 70 is a much larger multiplexer and has many more input leads than is pictured in FIG. 2A. Some of the input leads of multiplexer 70 are coupled to minipads 77.

In one example, processor 13 writes a series of 4-bit values into a set 71 of 4-bit registers in a data logging buffer 72. Each 4-bit value identifies a node, the voltage of which is to be measured by ADC 64. The order of 4-bit values written into the set 71 of registers determines the order that the ADC conversions will occur. Sequencer 65 reads a 4-bit value, and controls multiplexer 70 to couple the associated node to the ANALOG IN input lead of the ADC, and then causes a conversion to occur by writing to the CEN bit of the ADC control register 67. Sequencer 65 reads from and writes to data logging buffer 72 via control conductors 80. The resulting digital value is then stored into the associated one of a set 73 of data registers. The sequencer repeats this process, proceeding one by one down the list of 4-bit values in set 71. When one cycle of this operation is complete after performing a conversion for each 4-bit value present in register set 71, the data logging buffer 72 asserts the CYCLE COMPLETE signal on conductor 74. This signal interrupts the processor via the INT[0] input to interrupt controller 43 so that the processor 13 can then read the digital values in the data registers 73 via interconnections 75 across the processor local bus 30. Processor 13 controls the data logging process indirectly through sequencer 65 and by writing node ID values into set 71.

Driver Manager Tile

Figure 2B:
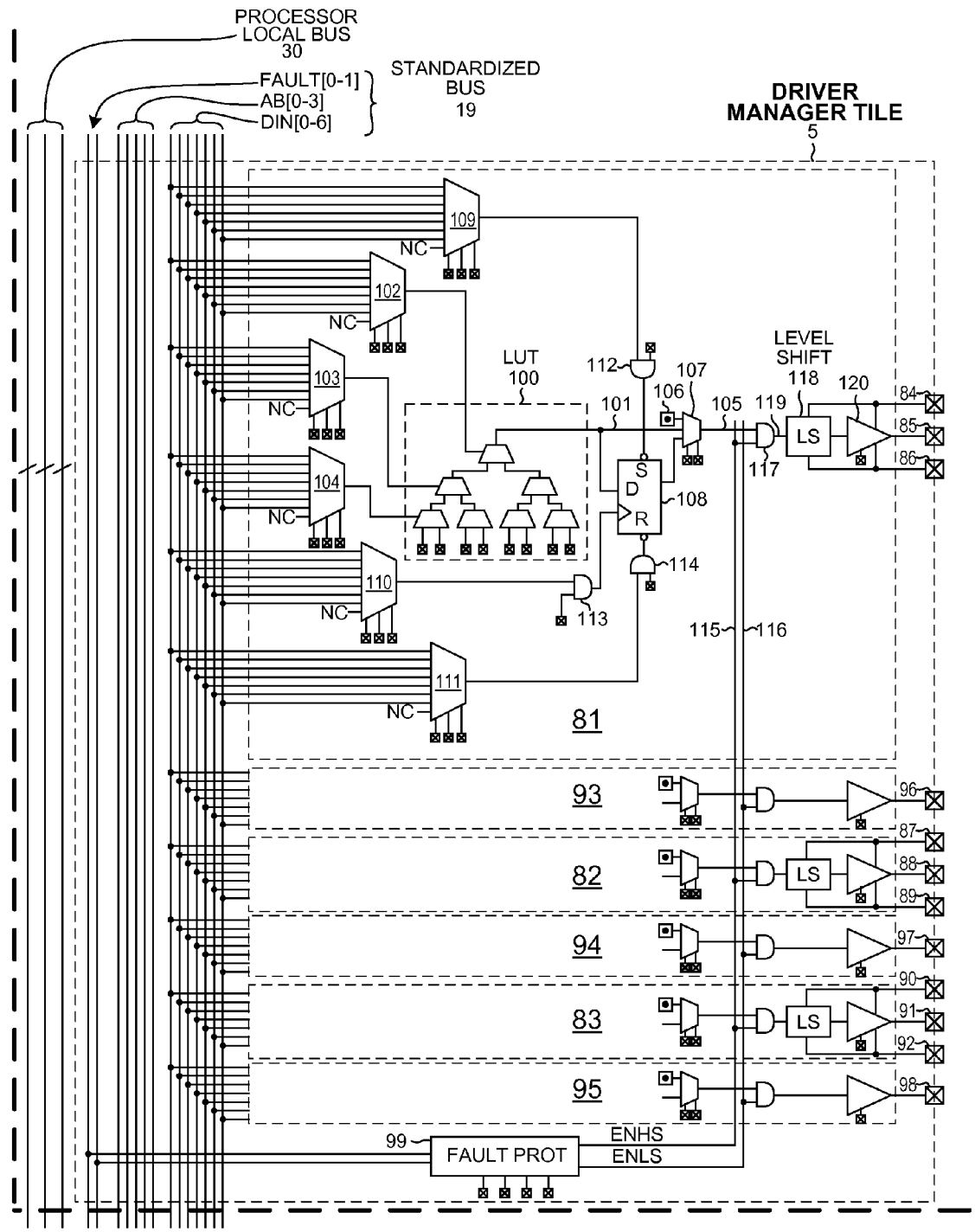

FIG. 2B is a simplified diagram of driver manager tile 5. Driver manager tile 5 includes three high-side driver circuits 81-83 and associated terminals 84-92, three low-side driver circuits 93-95 and associated terminals 96-98, a fault protection circuit 99, and a vertically extending bus portion of the standardized bus. One of the high-side driver circuits 81 is shown in detail. Look Up Table (LUT) structure 100 outputs a digital signal onto conductor 101. LUT structure 100 can be programmed so that the logical value of this digital signal is any desired combinatorial function of the logic values on any selected three of the digital bus conductors DIN[0-6]. The three configuration bits associated with multiplexer 102 determine the first selected one of the three DIN[0-6] signals, the three configuration bits associated with multiplexer 103 determine the second selected one of the three DIN[0-6] signals, and the three configuration bits associated with multiplexer 104 determine the third selected one of the three DIN[0-6] signals. The combinatorial logic function performed by the LUT is determined by the eight configuration bits shown within the dashed block labeled LUT. All these configuration bits are programmed by processor 13 by writing configuration register 27 across the standardized bus 19. The output of LUT 100 can be supplied directly onto node 105, or a registered version of the output of the LUT can be supplied onto node 105, or the signal on a minipad 106 can be supplied onto node 105, depending on the values of two configuration bits that set the select input values of multiplexer 107. Processor 13 determines which of the DIN[0-6] signals are supplied to the clock, the set, and the reset input leads of flip-flop 108 by programming the configuration bits for multiplexers 109-111 and AND gates 112-114 appropriately. The configuration bits of the AND gates coupled to the set and reset input leads of the flip-flop are usable by the processor to strobe reset the flip-flop and to strobe set the flip-flop.

There are two vertically extending fault signal conductors 115 and 116. Fault signal conductor 115 carries the active high enable high-side signal ENHS. Fault signal conductor 116 carries the active high enable low-side signal ENLS. Asserting ENHS high enables the high-side drivers to drive their respective terminals, whereas deasserting ENHS low disables the high-side drivers. Asserting ENLS high enables the low-side drivers to drive their respective terminals, whereas deasserting ENLS low disables the low-side drivers. In the case of the uppermost high-side driver 81, AND gate 117 supplies a digital signal to level shift circuit 118. Level shift circuit 118 level shifts a zero volt digital logic low value on node 119 to the voltage level on terminal 84, and level shifts a 5.0 volt (internal VDDIO) digital logic high value on node 119 to the voltage level on terminal 86. Driver 120 comprises a chain of logic inverters of ever increasing size, where the source of the N-channel pull down transistor of the last inverter is coupled to terminal 86, and where the source of the P-channel pull up transistor of the last inverter is coupled to terminal 84, and where the output lead of the last inverter of the chain is coupled to terminal 85.

The low-side driver circuits 93-95 of driver manager tile 5 are of similar construction to the high-side driver circuits, except that the low-side driver circuits 93-95 do not include the level shift circuits (such as level shift circuit 118) nor the bootstrap high and low terminals (such as terminals 84 and 86). The voltage levels driven by the low-side drivers are 12.0 volt VP voltage for a high level and ground potential for a low level.

Fault protection circuit 99 is controlled by several associated configuration bits. These bits are writable across the standardized bus 19 by processor 13. The two input leads to the fault protection circuit are hardwired to the two dedicated fault protection conductors FAULT[0-1] of the standardized bus. The values of the configuration bits determine the logical function performed by the fault protection circuit on the FAULT[0-1] signals to generate each of the ENHS and ENLS output signals. Although the configuration bit symbols in FIG. 2B are shown distributed across the tile, this is for ease of illustration. The configuration bits are bits of configuration register 27.

Power Manager Tile

Figure 2C:
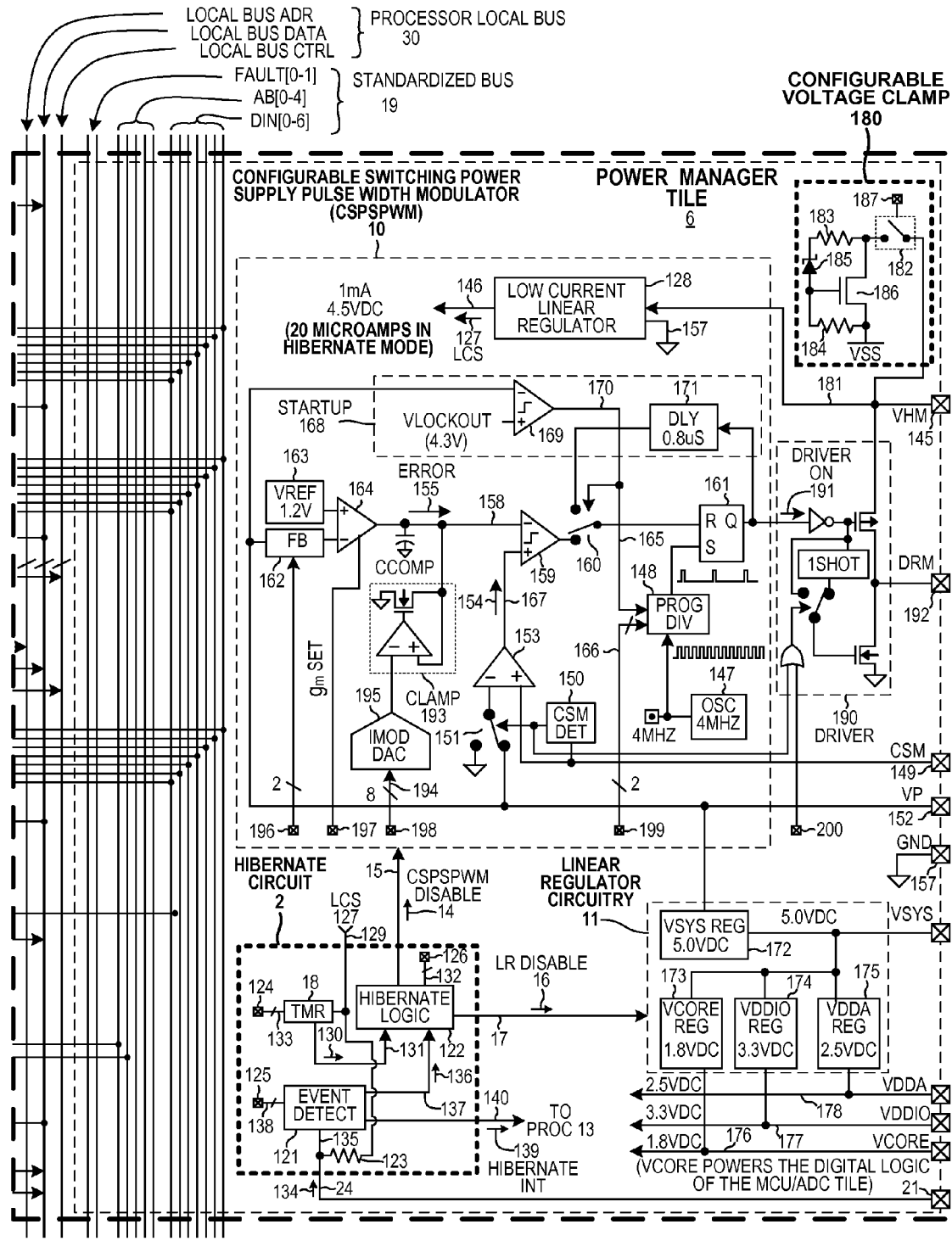

FIG. 2C is a simplified diagram of power manager tile 6. Power manager tile 6 includes the hibernate circuit 2 that is operable in the hibernate mode. Power manager tile 6 is operable to receive power from a selectable one of a variety of different external power sources that might be available in a given application. Such an external power source might be, for example, a battery such as a 48V lead acid battery or lithium-ion battery pack, a solar cells array, an AC power source such as standard 110 volt AC wall power, or the output of an external power supply such as an external 5.0 volt DC wall adapter. The power manager tile 6 receives power from the external power source and outputs supply voltages that satisfy all the power needs of the MTPMIC 1. To achieve this flexibility, the power manager tile 6 includes the CSPSPWM 10. The CSPSPWM 10 is configurable in different ways along with a small number of select external components (external to MTPMIC 1) to realize a step down converter, or a high voltage step down converter that accepts an input supply voltage of up to 400 volts, or a flyback converter, or a boost converter.

The hibernate circuit 2 includes the timer 18, event detect block 121, hibernate logic block 122, and a resistor 123. The configuration bits 124-126 store configuration information that determines how the hibernate circuit 2 is configured. A low current voltage LCS 127 generated by an always-on low current linear regulator 128 of the CSPSPWM 10 is supplied to the timer 18 and event detect block 121 via conductor 129. The low current linear regulator 128 is supplied by a current directly from a power source through VHM terminal 145 via conductor 181. The hibernate logic block 122 supplies the digital logic control signal CSPSPWM DISABLE 14 to the CSPSPWM 10 via conductor 15, and supplies the digital logic control signal LR DISABLE 16 to the linear regulator circuitry 11 via conductor 17. One of the configuration bits 124-126 is a hibernate mode enable bit that determines whether the hibernate circuit 2 is operating in the hibernate mode. The processor 13 enables the hibernate mode by writing across standardized bus 19 and setting the hibernate mode enable bit to a digital logic high value ("1").

If the hibernate mode is enabled, then the hibernate logic block 122 asserts the CSPSPWM DISABLE signal 14 and the LR DISABLE signal 16 causing the CSPSPWM 10 and linear regulator circuitry 11 to be disabled. Disabling the CSPSPWM 10 cuts power to nearly all circuitry within the MTPMIC 1. Processor 13 is powered by a voltage generated by the linear regulator circuitry 11 and thus disabling the linear regulator circuitry 11 causes the processor 13 to be disabled. In the hibernate mode, the always-on low current linear regulator 128 continues to supply timer 18 and event detect block 121 with the low current voltage LCS 127, however loading current on the low current voltage LCS 127 is very low during the hibernate mode. The low current linear regulator 128 supplies a current that does not exceed three-hundred microamps. In one example, the low current linear regulator 128 supplies a current that is around twenty microamps. By continuing to supply this minimal current, timer 18 and event detect block 121 continue to operate in the hibernate mode.

After the hibernate mode is enabled, the hibernate circuit 2 remains in the hibernate mode until an event signal causes the hibernate mode to be disabled. The way in which the event signal causes the hibernate mode to be disabled is determined by the configuration of the hibernate circuit 2. The hibernate circuit 2 is configurable in one of two configurations. If the hibernate circuit 2 is configured in the first configuration, then the hibernate circuit 2 remains in the hibernate mode until the timer 18 generates an event signal. If, on the other hand, the hibernate circuit 2 is configured in the second configuration, then the hibernate circuit 2 remains in the hibernate mode until an event signal is received onto terminal 21 of the MTPMIC 1. The processor 13 configures the hibernate circuit 2 prior to enabling the hibernate mode by writing to the configuration bits 124-126.

When the hibernate circuit 2 is configured in the first configuration, the hibernate circuit remains in the hibernate mode for a configurable amount of time. After the timer 18 determines that the amount of time has lapsed, the timer 18 generates event signal 130 and supplies the event signal 130 to hibernate logic block 122 via conductor 131. The hibernate logic block 122 receives the event signal 130 and in response sets the hibernate mode enable bit to a digital logic low value ("0") via conductors 132 causing the hibernate mode to be disabled. The amount of time is configured by the processor 13 before enabling the hibernate mode by writing a digital logic value to the configuration bits 124. The timer receives the digital logic value via conductors 133.

In one example of operation in the first configuration, configuration bits 124 store a 3-bit digital value indicative of the amount of time the hibernate circuit 2 remains in the hibernate mode, where the 3-bit digital value represents one of the following lengths of time: 0.125 seconds, 0.25 seconds, 0.5 seconds, 1.0 seconds, 4.0 seconds, 8.0 seconds, 16.0 seconds and infinite. In this example, if the processor writes a digital value of "101" to the configuration bits 124 and sets the hibernate mode enable bit to "1", then the hibernate circuit 2 will enter the hibernate mode and will remain in the hibernate mode for 8.0 seconds. After 8.0 seconds have lapsed, timer 18 generates event signal 130 causing the hibernate mode to be disabled.

When the hibernate circuit 2 is configured in the second configuration, the hibernate circuit remains in the hibernate mode until an event signal 134 is received onto the event signal terminal 21. Event detect block 121 detects the event signal on an input lead 135 using pull-up resistor 123. The input lead 135 is resistively coupled to supply conductor 129 via pull-up resistor 123 and is directly coupled to the event signal terminal 21 via conductor 24. If event detect block 121 detects the presence of the event signal 134, then the event detect block 121 asserts a digital control signal 136 and supplies the digital control signal 136 to the hibernate logic block 122 via conductor 137. The hibernate logic block 122 receives the digital control signal 136 and in response sets the hibernate mode enable bit to a digital logic low value ("0") via conductors 132 causing the hibernate mode to be disabled. Processor 13 configures the hibernate circuit 2 to operate in the second configuration by writing configuration information to the configuration bits 125. The event detect block 121 receives the configuration information via conductors 138.

In one example operation in the second configuration, a push-button switch (not shown, see FIG. 5) external to MTP-MIC 1 couples the event signal terminal 21 to a ground conductor. When the push-button is pressed, the input lead 135 of event detect block 121 shunts to ground indicating a push-button event has occurred. Event detect block 121 detects this condition and asserts control signal 136 causing the hibernate mode to be disabled. On the other hand, when the push-button is un-pressed, the input lead 135 of event detect block 121 floats to the low current voltage LCS 127 present on supply conductor 129 indicating that no push-button event has occurred.

In addition to disabling the hibernate mode, an event signal is also used to enable the hibernate mode when the hibernate circuit 2 is configured in the second configuration. During operation of MTPMIC 1, if event detect block 121 detects the presence of an event signal on input lead 135, then the event detect block 121 asserts an interrupt signal HIBERNATE INT 139 and supplies the HIBERNATE INT signal 139 to interrupt controller 43 of the MCU/ADC tile 4 (see FIG. 2A) via conductor 140. In response, processor 13 enters interrupt handling and sets the hibernate mode enable bit such that the hibernate mode is enabled. Conductor 140 is configured to supply an interrupt signal over standardized bus 19 to the interrupt controller 43. After the hibernate circuit 2 is operating in the hibernate mode, an external push-button event that generates an event signal on event signal terminal 21 causes the hibernate mode to be disabled as described above.

CSPSPWM 10 includes a small, low current linear regulator 128. This internal linear regulator 128 receives an unregulated voltage via terminal VHM 145 and outputs a regulated 4.5 volt DC source LCS 127. The linear regulator 128 is supplied by a current directly from the power source, either directly for a voltage lower than eighty volts or through a resistor for a voltage higher than one-hundred volts. Connections between the output lead 146 of the regulator to the other circuits of CSPSPWM 10 are not shown, but the internal regulator 128 is used to power the remainder of the CSPSPWM 10. In addition, when the hibernate circuit 2 is in the hibernate mode, the internal regulator 128 continues to supply the LCS supply voltage 127 to hibernate circuit 2, however, the LCS supply voltage 127 does not exceed three-hundred microamps. The loading on the LCS supply voltage 127 is typically around twenty microamps in the hibernate mode. In this way, hibernate circuit 2 continues to be powered in the hibernate mode and is operable to disable the hibernate mode in response to an event signal.

An internal RC oscillator 147 generates a 4 MHz signal. This 4 MHz signal is divided down by programmable divider 148 to generate an output square wave digital signal that starts each pulse of the signal output by CSPSPWM 10. The frequency of the signal output by programmable divider 148 is a selectable one of the following: 12.5 kHz, 50 kHz, 100 kHz, 200 kHz and 400 kHz. Two programmable configuration bits received via conductors 166 determine which one of 50 kHz, 100 kHz, 200 kHz and 400 kHz will be output if a third control bit one conductor 165 is a digital logic low. If the third control bit on conductor 165 is a digital logic high, then programmable divider 148 outputs a 12.5 kHz square wave.

During each on pulse of the main external switch, the current flowing through the main external switch increases. Current sense terminal CSM 149 is used to detect the magnitude of this increasing current by measuring a voltage drop across an external current sense resistor. This external current sense resistor is disposed in the current path of the main switch. Depending on the type of switching power supply that the power manager tile is configured to be a part of, the current sense function performed by the CSM terminal 149 is either a high-side current sense or a low-side current sense. A CSM mode detect block 150 receives the voltage on the CSM terminal 149 and from this voltage determines whether the CSM terminal has been connected in a high-side current sense configuration or in a low-side current sense configuration. The CSM mode detect block 150 does this by detecting the CSM voltage when the external switch is being controlled from terminal 192 to be off. If the CSM voltage is less than 0.5 volts when the external switch is being controlled to be off, then CSM mode detect block 150 determines that the power manager tile 6 is connected to require low-side current sense, otherwise if the CSM voltage is higher than 0.5 volts when the external switch is being controlled to be off then CSM mode detect block 150 determines that the power manager tile 6 is connected to require high-side current sense. If the CSM mode detect block 150 detects that high-side current sense is required, then the CSM mode detect block 150 controls switch 151 to couple the voltage from terminal VP 152 onto the inverting input lead of amplifier 153 such that the amplifier 153 amplifies the voltage difference between the voltage on terminal CSM 149 and the voltage on terminal VP 152. If the CSM mode detect block 150 detects that low-side current sense is required, then the CSM mode detect block 150 controls switch 151 to couple ground potential from terminal 157 onto the inverting input lead of amplifier 153 such that the amplifier 153 amplifies the voltage difference between the voltage on terminal CSM 149 and ground 157.

When the overall switching power supply (CSPSPWM 10, driver, and external components) is operating, and when the main external switch of the power supply is controlled to be on during a pulse, the amplified current sense signal 154 output by amplifier 153 increases until it exceeds the magnitude of an error signal 155 present on node 158. When the amplified current sense signal 154 exceeds this level, then comparator 159 switches its output signal level from a low digital level to a high digital level. This high digital level signal passes through switch 160 and resets flip-flip 161, thereby terminating the on pulse. Terminating the on pulse turns off the external main switch.

The main power supply output voltage VP being generated by the overall power supply is to be present on terminal VP 152. If the voltage on terminal VP 152 is higher then less power is required, whereas if the voltage detector on terminal VP 152 is lower then more power is required. Accordingly, the voltage difference between the voltage on terminal VP 152 (as divided down by a programmable resistor voltage divider FB 162) and a reference voltage (as output by a 1.2 volt bandgap voltage generator 163) is amplified by an error amplifier 164, thereby generating the analog ERROR signal 155 on node 158. As the switching power supply operates, the analog ERROR signal 155 goes up in voltage if more power is required and goes down in voltage if less power is required. If the ERROR signal 155 is made to be higher than during a switching cycle the rising current sense output signal 154 on node 167 will cause the on pulse of the main switch to be terminated later, whereas if the ERROR signal 155 is made to be lower then the current sense output signal 154 on node 167 will cause the on pulse of the main external switch to be terminated earlier.

The signal on the CSM terminal 149 is only considered valid for current sense purposes when the voltage VP on terminal 152 is greater than 4.3 volts. In a power supply start-up mode when voltage VP is still rising and is less than 4.3 volts, the CSM detect circuitry is not used to terminate on pulses but rather the pulse width modulation circuit is operated in a fixed 12.5 kHz low switching frequency safe mode using pulses of a fixed 0.8 microsecond pulse duration. In this start-up mode, the current sense is not needed and is not used but the power output capability of the power supply is quite degraded. Startup circuit 168 includes a comparator 169 that compares the voltage VP to the 4.3 volt VLOCKOUT voltage. If the voltage VP is less than 4.3 volts, then comparator 169 asserts the voltage level on node 170 to a digital low level resulting in divider 148 being controlled to output a 12.5 kHz square wave signal. In addition, the digital low level output by comparator 169 causes switch 160 to be switched to the up position. In the up position, the output of fixed delay element 171 terminates the on pulse after the fixed delay period of 0.8 microseconds.

As the power supply operates in the safe start-up mode, the voltage VP rises from cycle to cycle. Once the voltage VP rises to the point that it exceeds 4.3 volts, the pulse width modulator is made to operate in a power supply normal mode. Comparator 169 outputs a high level on node 170 causing switch 160 to switch into the down position so that the current detect circuitry 150 and 153 is used to terminate on pulses. The high digital level on node 170 stops controlling divider 148 to output the low 12.5 kHz frequency signal. Divider 148 therefore outputs its regular square wave of a higher switching frequency as determined by the two programmable configuration bits on conductors 166.

The operating of the power supply results in the VP output voltage being supplied via VP terminal 152 to linear regulator 172. From the VP supply voltage the linear regulator 172 generates a 5.0 volt DC supply voltage VSYS. Supply voltage VSYS in turn powers three other linear regulators 173-175. These linear regulators 173-175 output regulated supply voltages of 1.8 volts VCORE, 5.0 volts VDDIO, and 3.3 volts VDDA on conductors 176-178, respectively. The 1.8 volt VCORE voltage on conductor 176 powers the digital logic of the MCU/ADC tile 4 including processor 13. Once processor 13 is powered up and operating from this 1.8 volt VCORE source, then processor 13 can write configuration information back into the configuration register 12 of the power manager tile 6 to change operation of CSPSPWM 10.

Power manager tile 6 includes a configurable voltage clamp 180 that is operable to limit a voltage present on a low current linear regulator supply conductor 181. The configurable voltage clamp 180 includes a switch 182, resistors 183-184, zener diode 185 and a transistor 186. A digital logic value stored in configuration bit 187 determines whether the voltage clamp 180 is enabled. During startup, the digital logic value stored in configuration bit 187 is a digital logic high value ("1") and the voltage clamp 180 is enabled. The voltage clamp 180 operates to limit a voltage on conductor 181 to a maximum of twenty volts.

After startup, if the switching power supply (CSPSPWM 10, driver, and external components) is operating as an AC-to-DC converter, then the voltage clamp 180 remains enabled and limits the voltage on conductor 181 to a maximum of twenty volts. In some applications, a voltage present on VHM terminal 145 may exceed 600 volts, in which case the voltage clamp 180 operates to clamp the voltage on conductor 181 at twenty volts and prevents damage to MTPMIC 1.

If, on the other hand, the switching power supply is operating as a DC-to-DC converter, then the voltage clamp 180 is disabled by processor 13 after startup. The voltage clamp 180 operates at a maximum current of one-milliamp. After the current on conductor 181 exceeds one milliamp, the voltage clamp 180 is no longer able to limit the voltage at twenty volts. In the DC-to-DC case, the voltage clamp 180 will continue to drain one milliamp of current after startup. To prevent this current consumption, processor 13 disables the voltage clamp 180 by writing a digital logic low value ("0") to the configuration bit 187 thereby disabling the clamp.

A programmable driver 190 receives the signal 191 output by the CSPSPWM 10 and drives driver terminal DRM 192. If the signal supplied to driver 190 is a digital logic high then driver 190 outputs the voltage on the VHM terminal 145 onto the DRM terminal 192. This corresponds to turning on the external switch. If, on the other hand, the signal supplied to driver 190 is a digital logic low then driver 190 outputs the voltage on ground terminal 157 onto the DRM terminal 192. This corresponds to turning off the external switch.

The ERROR signal 155 output by error amplifier 164 is an analog signal, but its highest possible signal level is limited by a DC clamp circuit 193. The output lead of DC clamp circuit 193 is coupled to the output lead of error amplifier 164. The voltage level to which the clamp circuit 193 clamps the highest possible signal level of the ERROR signal 155 is programmable and is set by setting the 8-bit input value supplied onto the inputs 194 of an 8-bit IMOD digital-to-analog converter (DAC) 195.

The various configuration bits of the power manager tile 20, including configuration bits of the hibernate circuit 2 and the voltage clamp 180, are identified by reference numerals 124-126, 187, and 196-200. Although these bits are illustrated as being placed in different locations in the tile, the configuration bits are bits of single configuration register 12.

Signal Manager Tile

Figure 2D:
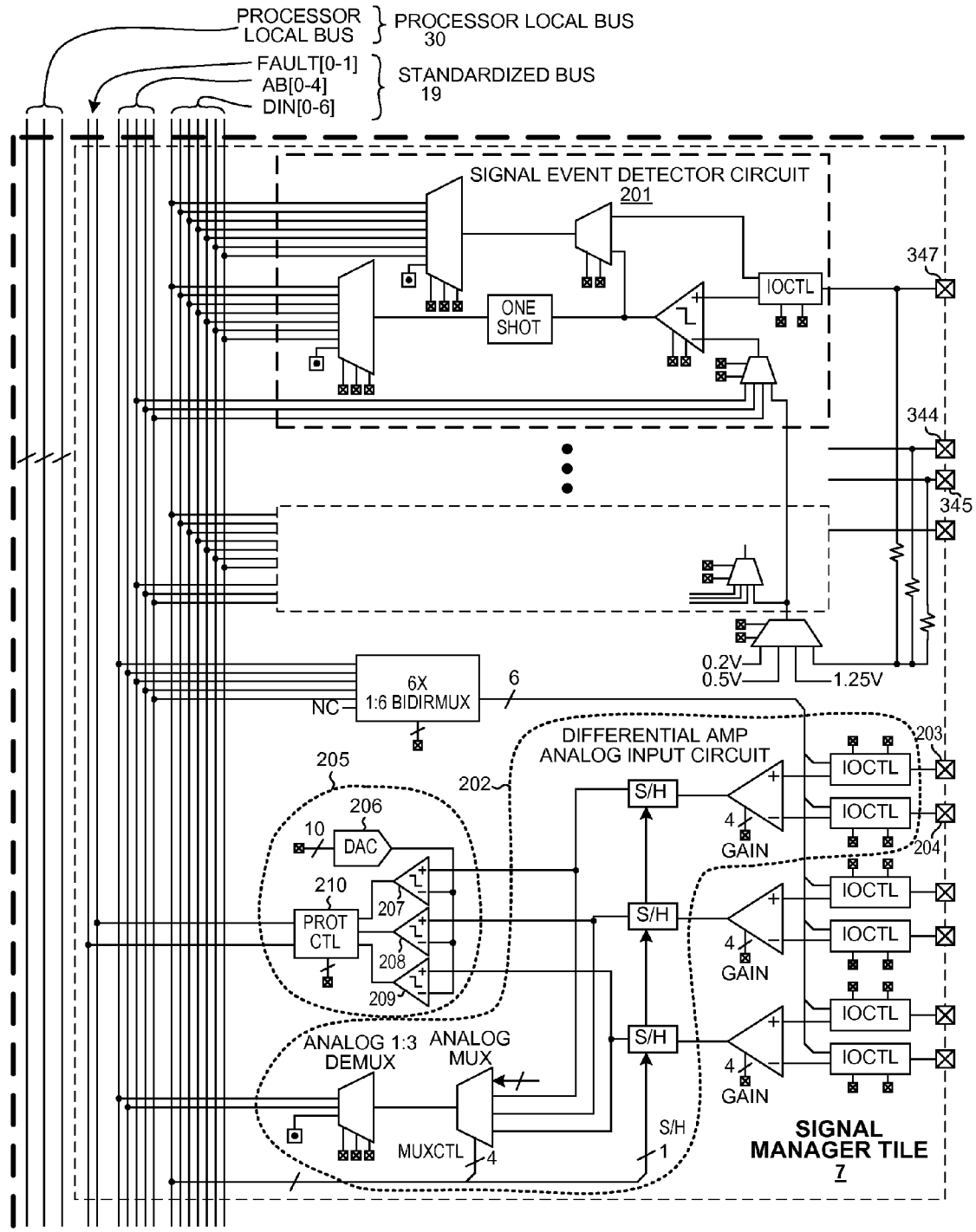

FIG. 2D is a simplified diagram of signal manager tile 7. Signal manager tile 7 includes four event signal detector circuits, three differential amplifier analog input circuits, a bus portion of the standardized bus, and a fault protection circuit. One of the event signal detector circuits 201 is shown in detail in FIG. 2D. The three differential amplifier analog input circuits are illustrated at the bottom of FIG. 2D. Reference numeral 202 identifies one of the upper differential amplifier analog input circuit involving analog input terminals 203 and 204. There are several programmable signal paths by which a signal output by a programmable differential amplifier of the signal manager tile can be supplied to the input of ADC 64 of the MCU/ADC tile 4 for analog-to-digital conversion.

Fault detection logic 205 is provided in the form of a programmable 10-bit Digital-to-Analog Converter (DAC) 206, three comparators 207-209, and protection control circuit 210. The 10-bit input to DAC 206 is programmable by processor 13 across the standardized bus 19. Although configuration bit symbols are illustrated in FIG. 2D spread across the tile, the configuration bits are all part of the same configuration register 28.

Figure 3:
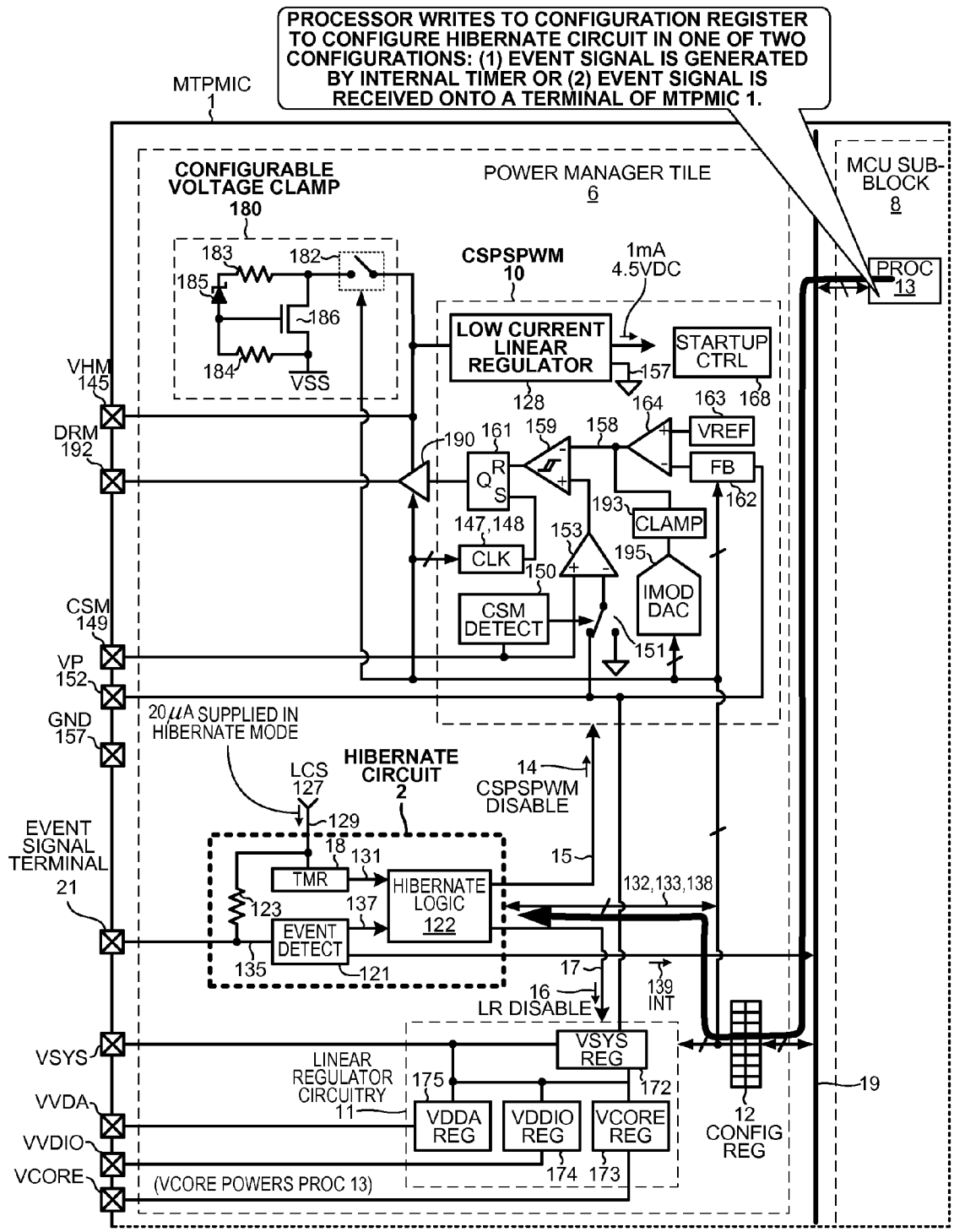
FIG. 3 is a simplified diagram showing how processor 13 configures the hibernate circuit 2.

FIG. 3 is a simplified diagram showing how processor 13 configures the hibernate circuit 2 in one of two configurations. Some of the internal details of the CSPSPWM 10 portion of the power manager tile 6 are omitted from FIGS. 3-5 due to space constraints in the drawings. Prior to enabling the hibernate mode, processor 13 configures hibernate circuit 2 by writing configuration information to configuration register 12 over standardized bus 19. After the hibernate circuit 2 is configured, processor 13 sets the hibernate mode enable bit to a digital logic high value ("1"). Hibernate circuit 2 receives the configuration information from configuration register 12 via conductors 132, 133 and 138, and the hibernate circuit 2 enters the hibernate mode.

Figure 4:
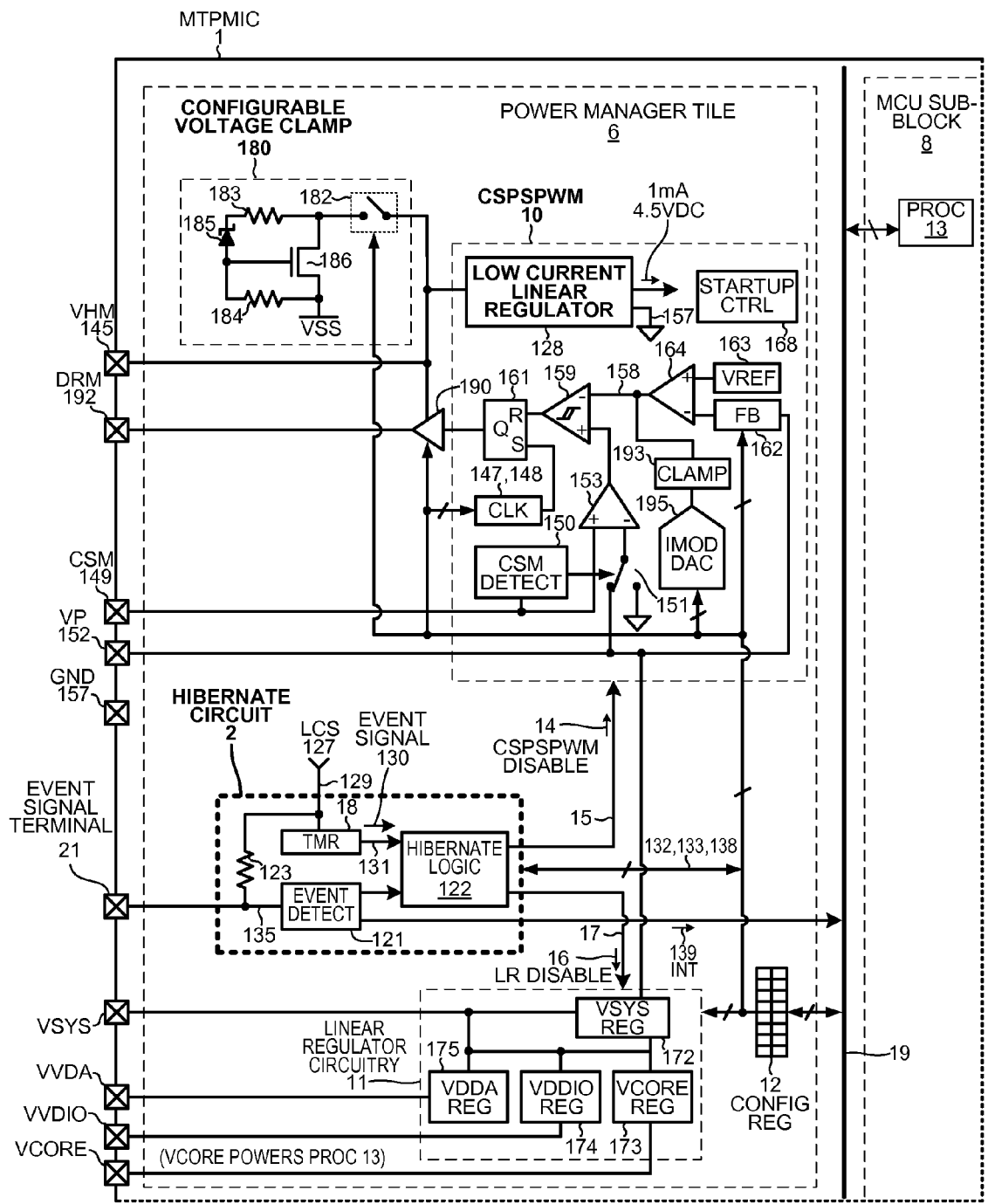
FIG. 4 is a simplified diagram of the hibernate circuit 2 operating in the first configuration where the event signal is generated by internal timer 18 of the MTPMIC 1.

FIG. 4 is a simplified diagram of the hibernate circuit 2 operating in the first configuration where the event signal is generated by internal timer 18 of the MTPMIC 1. After the hibernate is enabled, timer 18 determines when an amount of time has lapsed and generates an event signal 130. The amount of time is configured by processor 13 prior to enabling the hibernate mode. The event signal 130 is supplied from the timer 18 to the hibernate logic block 122 via conductor 131. The hibernate logic block 122 receives event signal 130 and sets the hibernate mode enable bit to a digital logic low value ("0") by writing to configuration register 12 via conductors 132, 133 and 138. The hibernate mode is disabled and CSPSPWM enters the startup mode.

Figure 5:
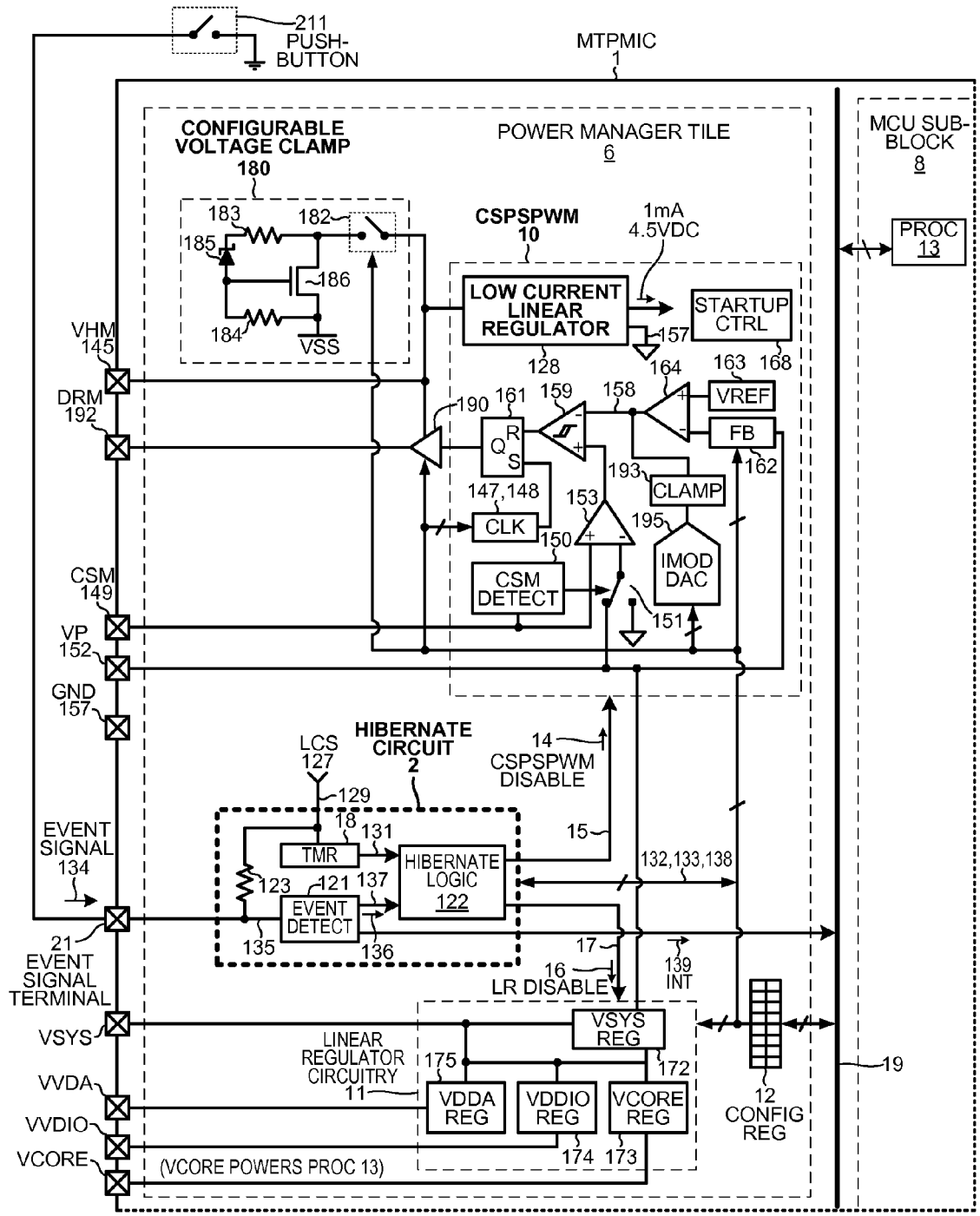
FIG. 5 is a simplified diagram of the hibernate circuit 2 operating in the second configuration where the event signal is received on a terminal 21 of the MTPMIC 1.

FIG. 5 is a simplified diagram of the hibernate circuit 2 operating in the second configuration where the event signal is received on a terminal 21 of the MTPMIC 1. After the hibernate is enabled, pressing push-button 211 causes an event signal 134 to be received onto event signal terminal 21. The push-button 211 is external to the MTPMIC 1. The event detect block 121 detects the presence of the event signal and generates a control signal 136. The hibernate logic block 122 receives control signal 136 and sets the hibernate mode enable bit to a digital logic low value ("0") by writing to configuration register 12 via conductors 132, 133 and 138. The hibernate mode is disabled and CSPSPWM enters the startup mode.

Hibernate Circuit Configuration Bits

Figures 6, 7:
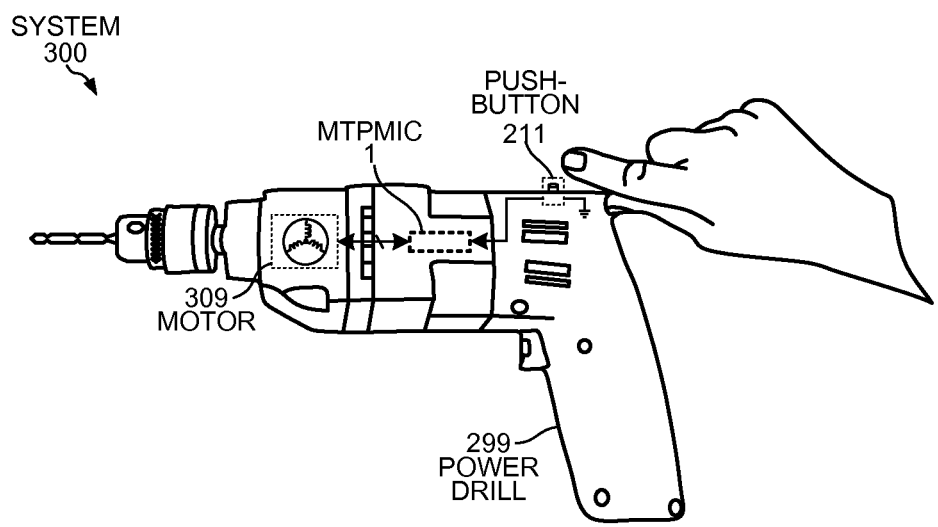
FIG. 6 is a table that sets forth the configuration register bits of the hibernate circuit 2.
FIG. 7 is a perspective diagram of a system 300 involving a motor controller application of MTPMIC 1.
Figure 8A:
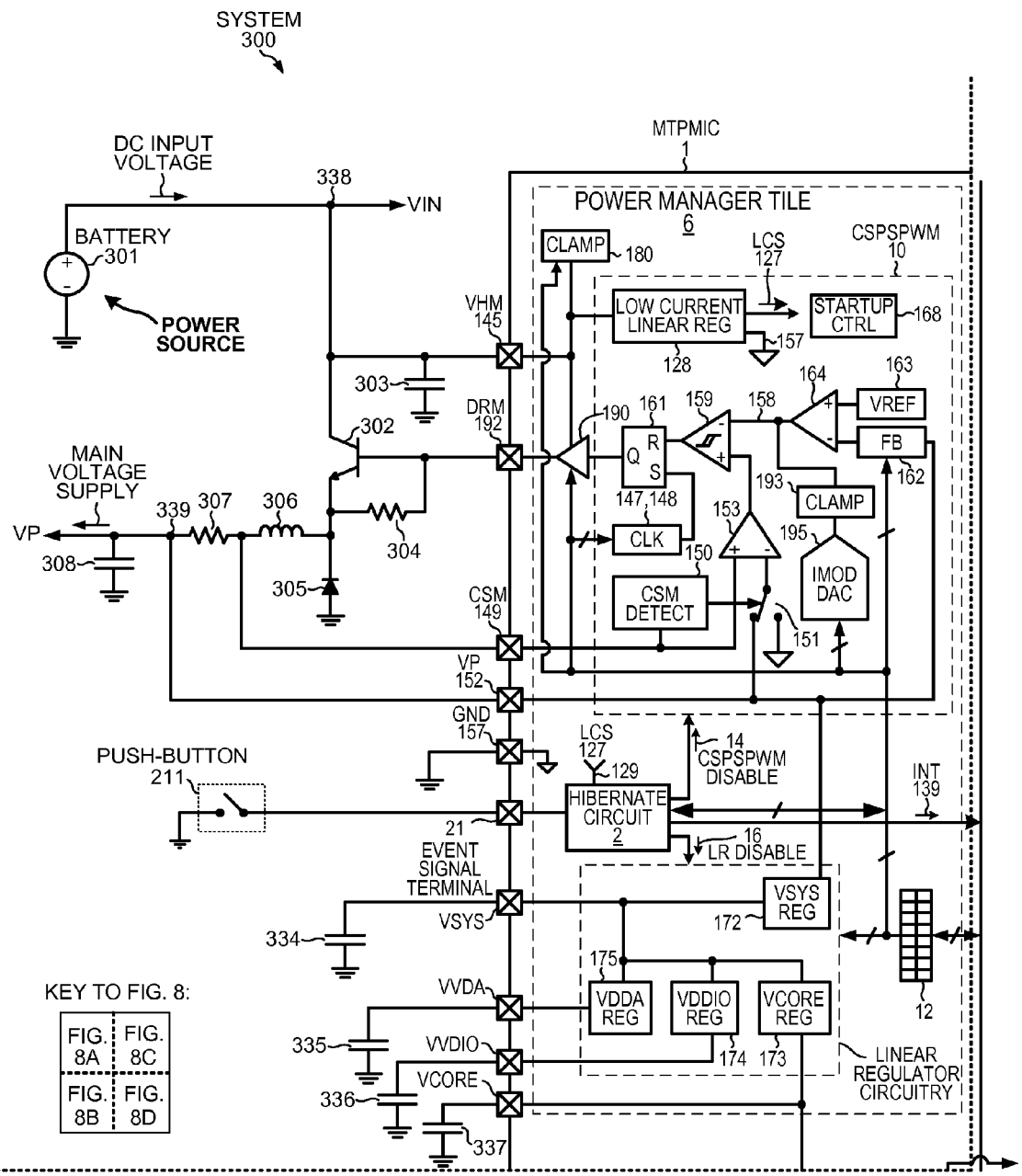
FIG. 8 comprises FIGS. 8A, 8B, 8C and 8D which together are a circuit diagram of the system 300 of FIG. 7.
Figure 8B:
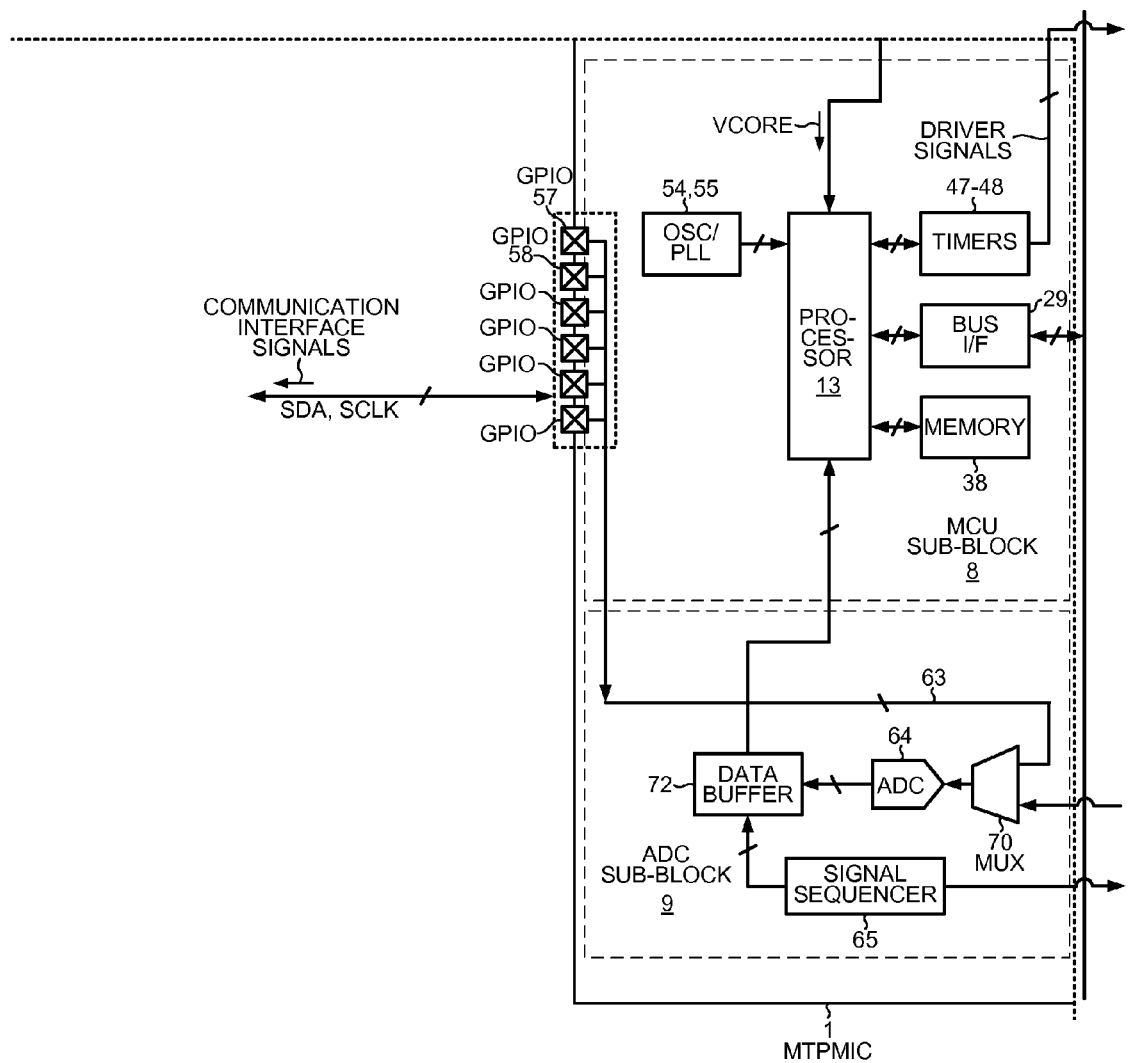
Figure 8C:
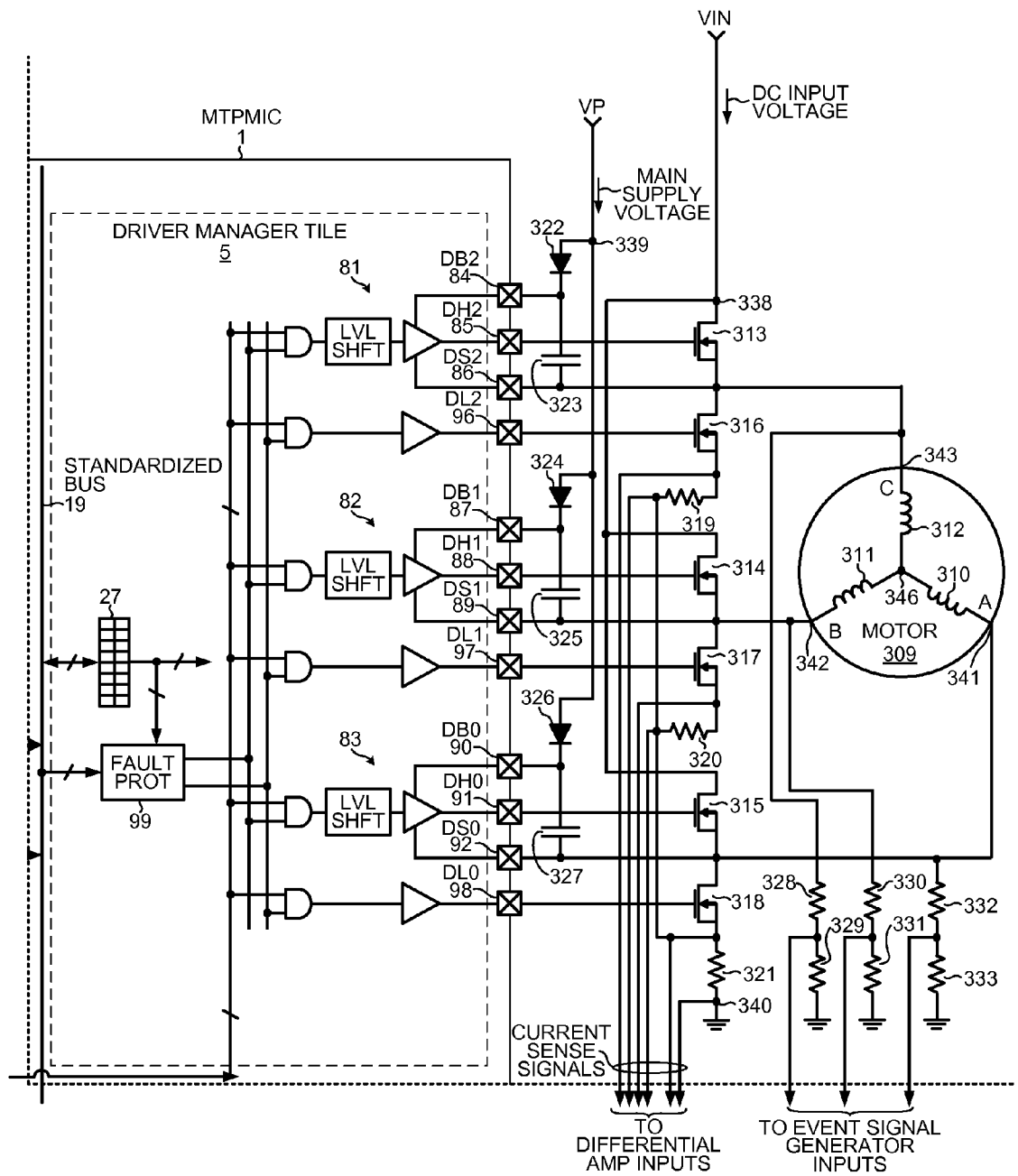
Figure 8D:
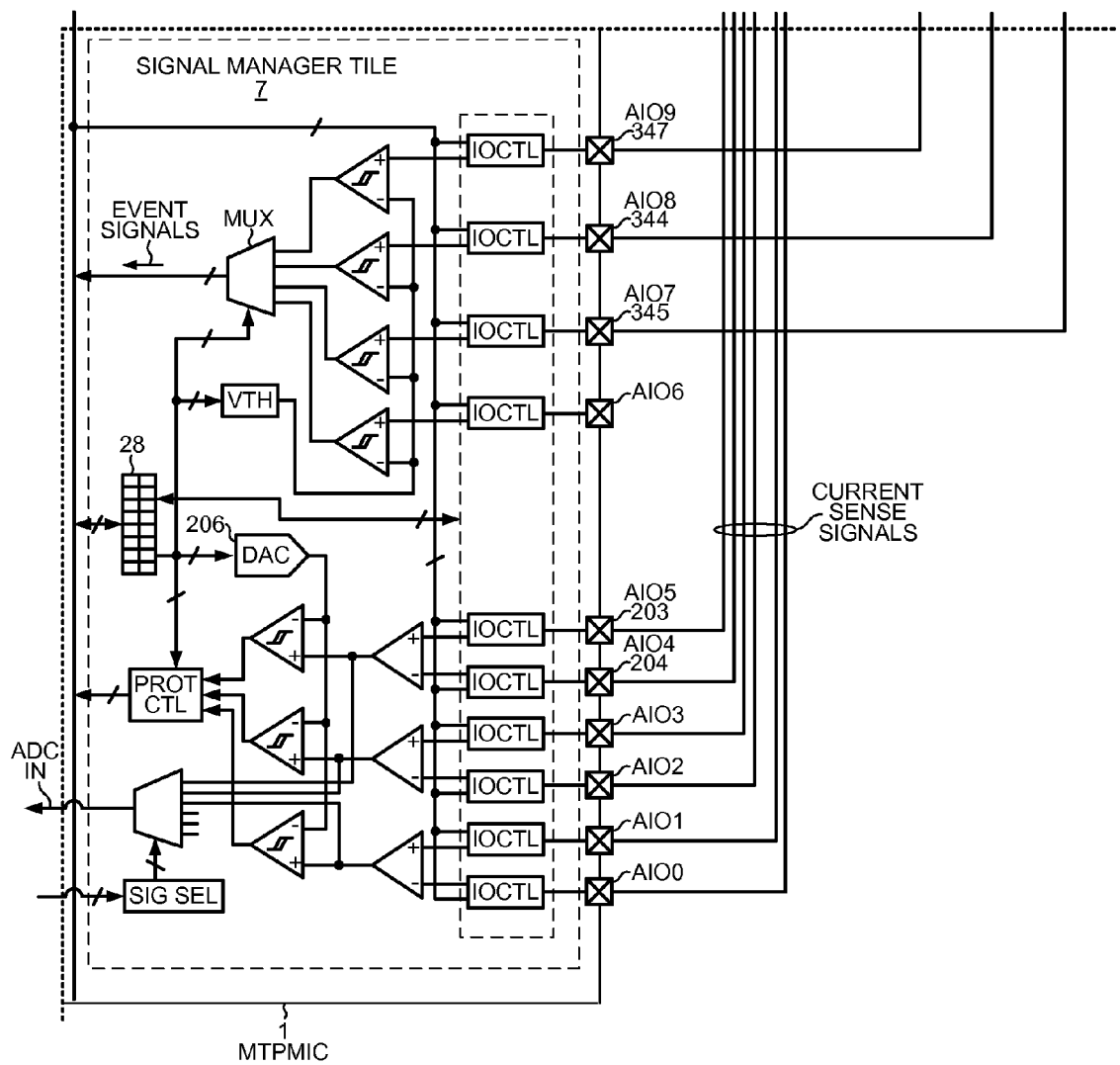

FIG. 6 is a table that sets forth the configuration register bits of the hibernate circuit 2. HIBERNATE bit is the hibernate mode enable bit that determines whether the hibernate circuit 2 is operating in the hibernate mode. PUSHBUTTON bit determines whether the hibernate circuit is configured in the second configuration where an event signal received onto the event signal terminal 21 of the MTPMIC 1 causes the hibernate mode to be disabled. The event signal is generated off-chip, typically by a push-button. TIMER<2:0> bits store a 3-bit digital value indicative of an amount of time the hibernate circuit 2 remains in the hibernate mode. PUSHBUTTONSTATUS bit is read by processor 13 to determine whether a push-button event has caused the interrupt. PUSHBUTTONINT bit enables the interrupt trigger by an external push-button.

Brushless Motor Controller Application with Hibernate Mode

FIG. 7 is a perspective diagram of a system 300 involving a motor controller application of MTPMIC 1. System 300 is used to control power drill 299.

FIG. 8 is a circuit diagram of the system 300 of FIG. 7. FIGS. 8A, 8B, 8C and 8D fit together to form FIG. 8. FIG. 8 is a somewhat simplified schematic version of MTPMIC 1 shown in FIG. 2. The package terminals of integrated circuit package 3 are omitted from FIG. 8. A key showing how FIGS. 8A, 8B, 8C and 8D fit together in this way is provided at the bottom left of FIG. 8A.

System 300 includes MTPMIC 1 and external circuit components 301-337. The power manager tile 6 and the external circuitry 301-337 are configured to form a step down buck converter power supply. Some of the internal details of the CSPSPWM 10 portion of the power manager tile are omitted from FIG. 8 due to space constraints in the drawings. See FIG. 2A for additional details. System 300 includes a push-button 211 that is configured to enable and disable the hibernate mode of hibernate circuit 2. The push-button 211 is external to the MTPMIC 1 of system 300. During operation of the MTPMIC 1 in the motor control application of FIG. 8, pressing the push-button 211 causes the hibernate circuit 2 to enter the hibernate mode and system 300 is unpowered (except for an amount of circuitry within the hibernate circuit 2 that continues to consume minimal current). Power drill 299 is off. While the hibernate circuit 2 operates in the hibernate mode, pressing the push-button 211 causes the hibernate circuit 2 to disable the hibernate mode. After startup of the MTPMIC 1, system 300 resumes normal operation supplying power to the power drill 299. Operation of system 300 is described below.

In the configuration of FIG. 8, the voltage VIN on conductor 338 is a DC supply voltage as output by battery 301. VIN can range from approximately 12.0 volts to 48.0 volts. In the present example, VIN is 48.0 volts and battery 301 is a multi-cell lead acid battery. The NPN bipolar transistor 302 drives an inductor 306 in the step-down configuration, which generates the main supply voltage VP on node 339 and terminal VP 152. Resistor 307 is a current sense resistor. It is coupled between terminal CSM 149 and terminal VP 152. In the illustrated example, voltage VP is 12.0 volts. Capacitor 308 is the main storage capacitor of the power supply. The voltage VP generated by the power manager tile is used to power the other tiles of MTPMIC 1 and to supply power to the external switching circuitry 313-327 that drives the external motor 309. The switching cycle of the power supply is programmable and should be set to be in the range of from about 200 kHz to about 400 kHz. In the present example, the switching frequency is 12.5 kHz in a start-up mode and 200 kHz in a normal operating mode.

Before power is applied to the system 300, all circuits on MTPMIC 1 are unpowered. When battery voltage VIN is applied, the internal regulator 128 begins supplying 4.5 volt DC supply voltage LCS 127 to the power manager tile circuitry. The linear regulator 128 is supplied by a current directly from the power source. Because the VP voltage is below the 4.3 VLOCKOUT voltage, the startup control block 168 controls the oscillator/divider 147/148 of CSPSPWM 10 to switch at a low 12.5 kHz frequency and with a fixed pulse width. These relatively infrequent pulses of safe and short durations are made to pulse the external NPN transistor 302 on in a safe manner. CSM mode detect block 150 determines that the current sense resistor is coupled in a high-side current sense configuration. In response, the CSM mode detect block 150 outputs a digital signal that controls the switch 151 to couple the non-inverting input lead of comparator 153 to the VP terminal 152. As CSPSPWM 10 causes the NPN transistor to be pulsed on from cycle to cycle, the voltage on storage capacitor 308 gradually increases. When startup control block 168 determines that voltage VP is above 4.3 volts, then startup control block 168 causes the power supply to start switching at the higher normal mode switching frequency. This normal mode switching frequency is determined by two configuration bits of configuration register 12 (see FIG. 1). Each of these bits includes a non-volatile cell and a volatile cell. On power up, the content of the non-volatile cell is automatically loaded into the volatile cell. The contents of the volatile cell is output from the configuration bit to configure the associated circuit. The normal mode switching frequency is programmed into non-volatile cells so that when the power manager tile enters normal operating mode it will switch at a predetermined appropriate frequency. The predetermined frequency for this configuration is typically in the range of from 200 kHz to 400 kHz. The startup control block 168, upon detecting that voltage VP is greater than 4.3 volts, also controls the feedback loop of the switching controller such that the pulse width of the on pulses is no longer a fixed value, but rather is modulated under control the current sense circuitry and the feedback circuitry.

The resulting voltage VP on terminal 152 is used to power linear regulators 172-175. External capacitors 334-337 are the external capacitors for these linear regulators. The VCORE supply voltage output by regulator 173 is used to power the processor 13 of the MCU/ADC tile 4. Power is supplied from the output of VCORE regulator 173 via a conductor of the standardized bus 19 to the processor 13 in the MCU/ADC tile 4. Once powered from supply voltage VCORE, the processor 13 begins executing program code stored in RAM/FLASH 38. This program code causes the processor to then change the contents of certain configuration bits of the power manager tile 6 by making appropriate writes across the standardized bus 19. The power manager tile 6 may, for example, be reconfigured in this way such that the driver 190 is programmed to operate in the pulse pull down mode.

In the motor control application of FIG. 8, each of the three windings 310-312 of motor 309 is coupled to a pair of N-channel Field Effect Transistors (NFET). In each pair there is a high-side NFET and a low-side NFET. The high side NFETS are 313-315. The low-side NFETs are 316-318. Current flow through the motor involves current flow from the 48.0 volt VIN conductor 338, through one of the high-side NFETs, through one winding, to center node 346 of the motor, and from the center node 346 of the motor through another winding, and then through a conductive low-side NFET, and through a current sense resistor to ground node and ground conductor 340. The current sense resistors 319, 320 and 321 are coupled to the differential amplifiers of the signal manager tile 7 as shown so that MTPMIC 1 can measure and monitor the voltage drops across the three current sense resistors.

Each high-side NFET is coupled to a charging diode and a bootstrap capacitor as illustrated. The charging diodes are diodes 322, 324 and 326. The bootstrap capacitors are capacitors 323, 325 and 327. A gate voltage higher than the 48.0 volt VIN voltage is required to keep a high-side NFET on and conductive. The bootstrap capacitors are coupled to provide about 59.3 volts on the terminals 84, 87 and 90. This 59.3 volts present on terminals 84, 87 and 90 allows the high-side drivers 81, 82 and 83 to drive the gates of high-side NFETs to 59.3 volts to turn these NFETs on.

MTPMIC 1 is also coupled to sense voltage events on the three winding nodes 341-343 of the motor. Terminal 347 is coupled via resistor divider 328 and 329 to winding node C 343. Terminal 344 is coupled via resistor divider 330 and 331 to winding node B 342. Terminal 345 is coupled via resistor divider 332 and 333 to winding node A 341.

Motor and LED Driver Application with Hibernate Mode

Figure 9:
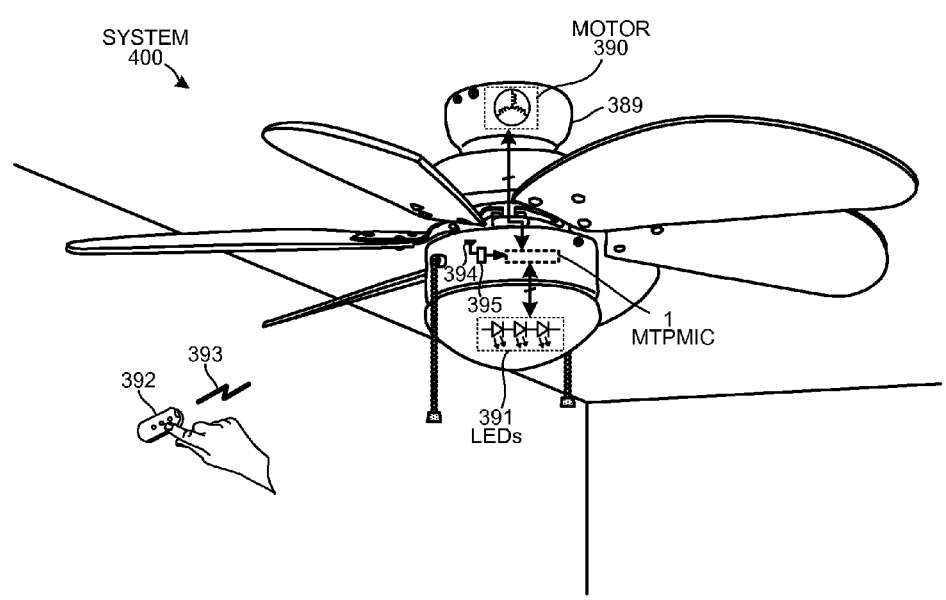
FIG. 9 is a perspective diagram of a system 400 involving a motor and LED driver application of MTPMIC 1.

FIG. 9 is a perspective diagram of a system 400 involving a motor and LED driver application of MTPMIC 1. System 400 controls fan assembly 389 which includes motor 390 and LED lighting 391. MTPMIC 1 satisfies all the power needs of system 400. During operation, remote control 392 is configured to transmit an Radio Frequency (RF) communication 393 to an antenna 394 whereby the RF communication 393 causes the hibernate mode to be enabled. A receiver 395 detects the presence of the RF communication 393 on antenna 394, and the receiver 394 supplies a digital signal to MTPMIC 1. MTPMIC 1 receives the digital signal and processor 13 of the MTPMIC 1 configures and enables the hibernate mode. System 400 is unpowered in the hibernate mode (except for an amount of circuitry within the hibernate circuit 2 that continues to consume minimal current). Motor 390 and LED lighting 391 are unpowered. After the configured amount of time has lapsed, timer 18 causes the hibernate circuit 2 to disable the hibernate mode.

After startup of the MTPMIC 1, if the receiver 395 detects the presence of a second RF communication (not shown) on antenna 394, then the receiver 395 supplies a second digital signal to MTPMIC 1. The second digital signal may indicate whether the motor 390 or LED lighting 391 should be switched on. If processor 13 determines that neither the motor 390 nor the LED lighting 391 should be switched on, then the processor 13 re-enables the hibernate mode and remains in hibernate mode until the timer determines the configured time has lapsed. On the other hand, if the second digital signal indicates that the motor 390 or LED lighting 391 should be switched on, then system 400 resumes normal operation supplying power to motor 390 and LED lighting 391.

FIG. 10 is a circuit diagram of the system 400 of FIG. 9. FIGS. 10A, 10B, 10C and 10D fit together to form FIG. 10. FIG. 10 is a somewhat simplified schematic version of MTP-MIC 1 shown in FIG. 2, and the package terminals of integrated circuit package 3 are omitted from FIG. 10. In addition, MTPMIC 1 includes driver manager tile 450 that is similar to driver manager tile 5, except that driver manager tile 450 is configured to drive motor 390 along with a separate die having ultra-high voltage high-side drivers (not shown). A key showing how FIGS. 10A, 10B, 10C and 10D fit together in this way is provided at the bottom right of FIG. 10A.

System 400 includes MTPMIC 1 and external circuit components 401-434. The power manager tile 6 and the external circuitry 401-438 are configured to form a boost converter. System 400 is configured to receive an RF Radio Frequency (RF) communication 393 generated by the remote control 392, and in response, enable the hibernate mode and remain in the hibernate mode for an amount of time configured by the processor 13. Operation of system 400 is described below.

An AC input 401 is the source of power. In the present example, the AC input power source 401 is standard 110 volts AC standard household wall power. The 110 VAC is full wave rectified by diode bridge 402. The rectified signal is smoothed by storage capacitor 403 such that a rough DC input voltage is present on node 435. A FET 408 is coupled to pull pulses of current from VIN node 435 through the primary winding of a transformer 411. Resistor 409 is a current sense resistor coupled between terminal CSM 149 and terminal VP 152. A first secondary winding 436 and a second secondary winding 437 are provided with rectifying diodes 412 and 413 and storage capacitors 414 and 415 to generate the main supply output voltage VP voltage onto terminal VP 152. The first secondary winding 436 (the upper one) outputs energy and charges its capacitor 414 in the FET on time, whereas the second secondary winding 437 (the lower one) outputs energy and charges its capacitor 415 in the FET off time. The combinations of the voltages on capacitors 414 and 415 is the main supply output voltage VP. In this example, VP is 12.0 volts. A rectifying diode 405 and storage capacitor 404 are provided to output a high voltage DC supply VBUS output on node 438. In this example, VBUS is 400 volts DC.

CSM mode detect block 150 detects the CSM voltage when the FET 408 is off. In the topology of FIG. 10, because voltage CSM is less than 0.5 volts when the FET is off, the CSM mode detect block 150 detects a low-side current sense configuration and controls switch 151 so that ground potential is supplied onto the non-inverting input lead of comparator 153. As in the example of FIG. 8 described above, upon startup the processor 13 and the rest of MTPMIC 1 is unpowered. The internal regulator 128 and driver 190 initially receive start up power from the VIN voltage through resistor 406 and capacitor 407, until the supply voltage VP is higher than VHM at which point the VHM voltage is supplied by VP through diode 410. From VHM the internal regulator outputs 4.5 volts DC supply voltage LCS 127 that powers the circuitry of CSPSPWM 10. Because the low current linear regulator 128 receives current directly from the VIN voltage through resistor 406 and supplies a low twenty microamp current when the hibernate mode is enabled, the power consumed by system 400 can be lower than 30.0 milliwatts in the total hibernate mode. As in the example of FIG. 8 described above, the startup control block 168 detects that VP is less than 4.3 volts, and in response controls the oscillator to begin switching the converter at a low 12.5 kHz switching frequency. The on pulse is made to be a fixed 0.8 microseconds. The FET 408 is pulsed on in this safe mode at a low rate and with short on pulses until the voltage VP reaches 4.3 volts. When voltage VP is detected to exceed 4.3 volts, then the switching frequency is changed to the predetermined switching frequency for normal mode operation. In this boost configuration, the predetermined switching frequency for normal mode operation is lower than in the case of the step-down buck converter of FIG. 8, and is typically about 50 kHz. In normal mode operation, the current sense and feedback circuitry is used to modulate the pulse width of the on pulses.

One purpose of the boost converter is to generate the 400 volt VBUS DC supply voltage on node 438. Such a 400 volt DC supply is a standard supply voltage used to achieve power factor correction. The input current being drawn from the 110 VAC source 401 is made to track the 110 VAC input sinusoidal voltage waveform of the 110 VAC wall power. The large capacitor 404 is used to filter out the 120 Hz ripple. Capacitor 404 is generally of a size of 0.5 microfarads per watt of output power.

Once voltage VP is stable and the power supply is operating in normal mode, the linear regulators 172-175 generate voltage VCORE and supply it to the processor 13 in the MCU/ADC tile 4. As in the example of FIG. 8, the processor 13 once powered begins executing program code stored in RAM/FLASH 38. Under software control, the processor can then reconfigure the power manager tile 6 by writing to the configuration register 12 of the power manager tile 6 across the standardized bus 19. For example, configuration register 12 is written such that the special pulse pull down mode of driver 190 is not enabled. Accordingly, the driver 190 in FIG. 10 either drives the voltage on terminal DRM 192 to the VHM voltage on terminal 145 or to ground potential on terminal GND 157. The driver 190 does not put the DRM terminal 192 into a high impedance state after pulsing the voltage on the DRM terminal 192 to ground potential for a short 250.0 nanosecond amount of time.

In the present example of FIG. 10 where the boost converter achieves power factor correction, processor 13 writes configuration information across the standardized bus 19 to program configuration register 12 in the power manager tile 6 such that the feedback circuit FB 162 causes amplifier 164 to rail high. This effectively disables the feedback circuit FB 162 from affecting the signal on node 158. Processor 13 uses a voltage divider involving resistors 416 and 417 and terminal 439 to monitor the VIN line voltage waveform using the ADC. Processor 13 uses a voltage divider involving resistors 418 and 419 and terminal 440 to monitor the VBUS voltage using the ADC. Based on these ADC measurements of VIN and VBUS, processor 13 adjusts the 8-bit value input of IMOD DAC 195 every ten microseconds over the 60 Hz cycle of the 110 VAC input source waveform so that the current drawn by the power supply tracks the 110 VAC sinusoidal waveform, thereby achieving an in-phase power factor corrected current draw from the 110 VAC wall power source.

Figure 10A:
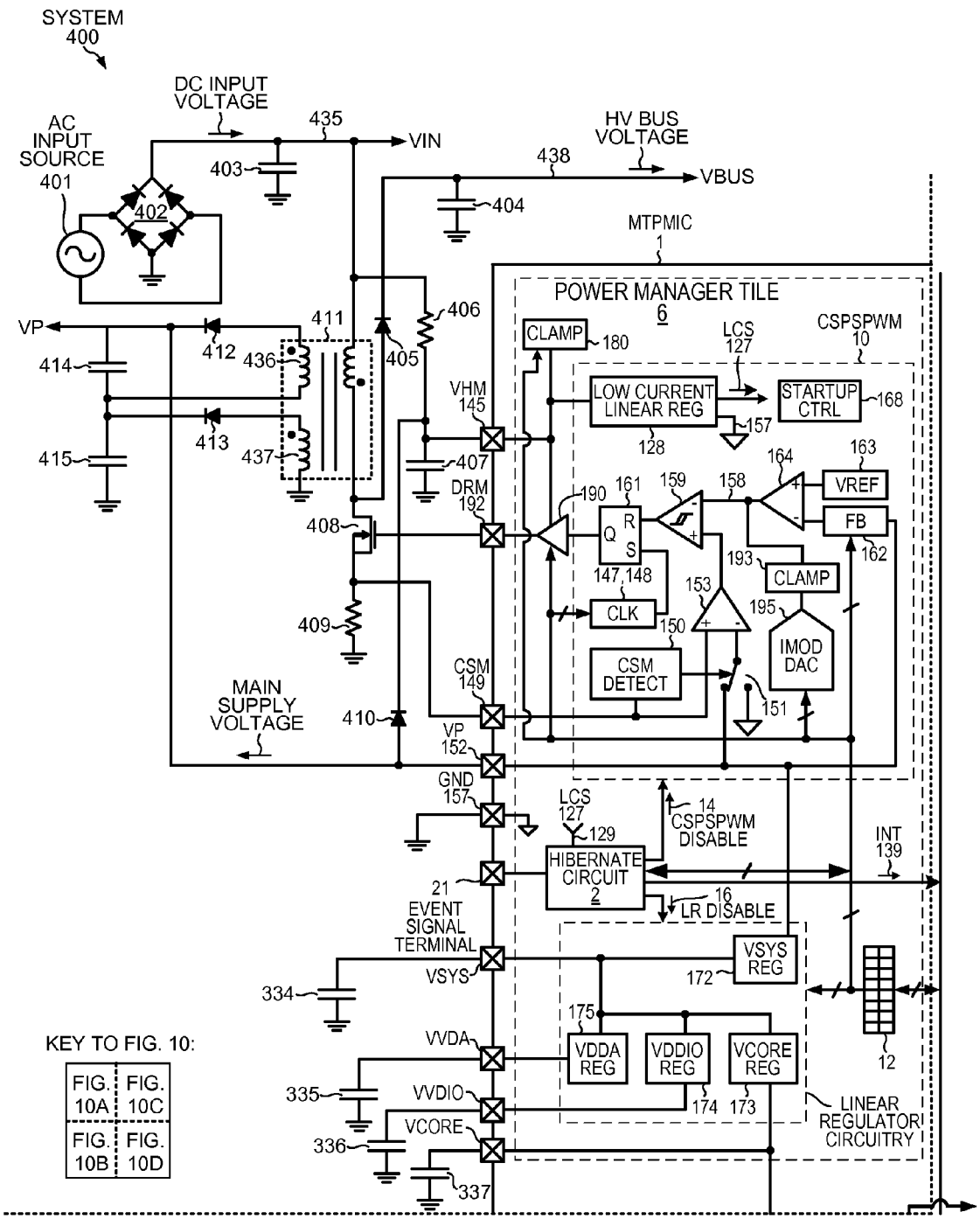
FIG. 10 comprises FIGS. 10A, 10B, 10C and 10D which together are a circuit diagram of the system 400 of FIG. 9.
Figure 10B:
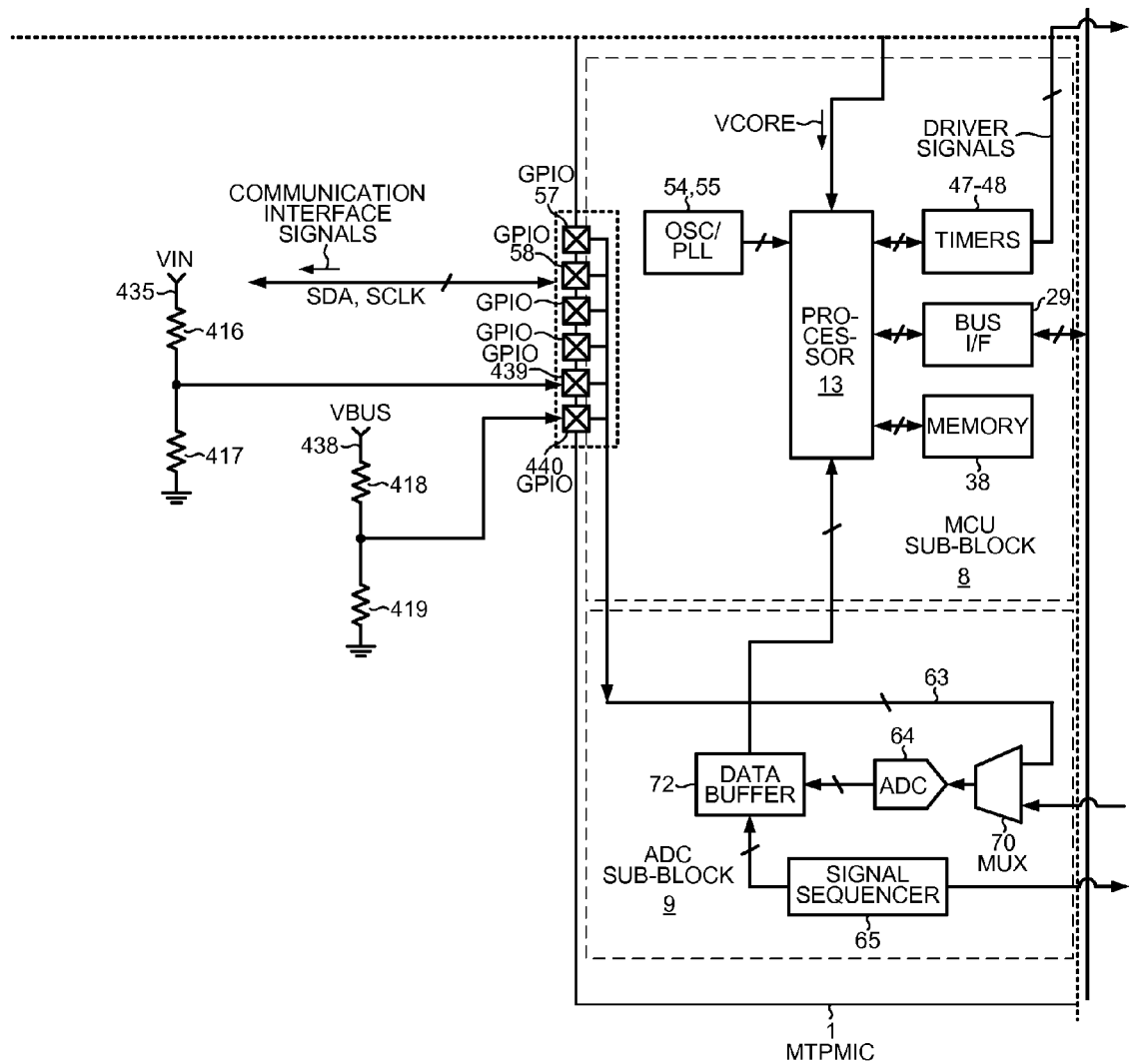
Figure 10C:
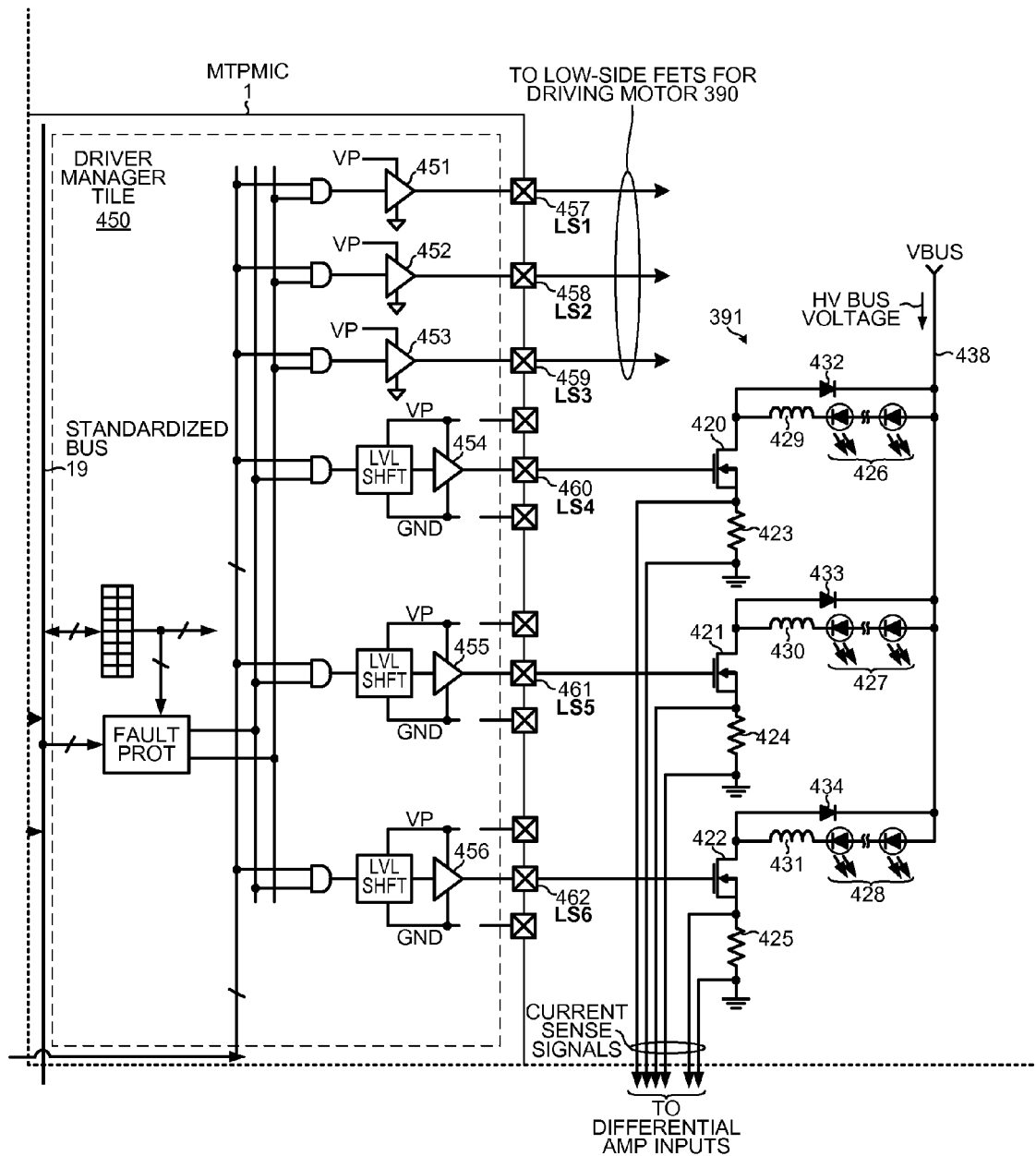
Figure 10D:
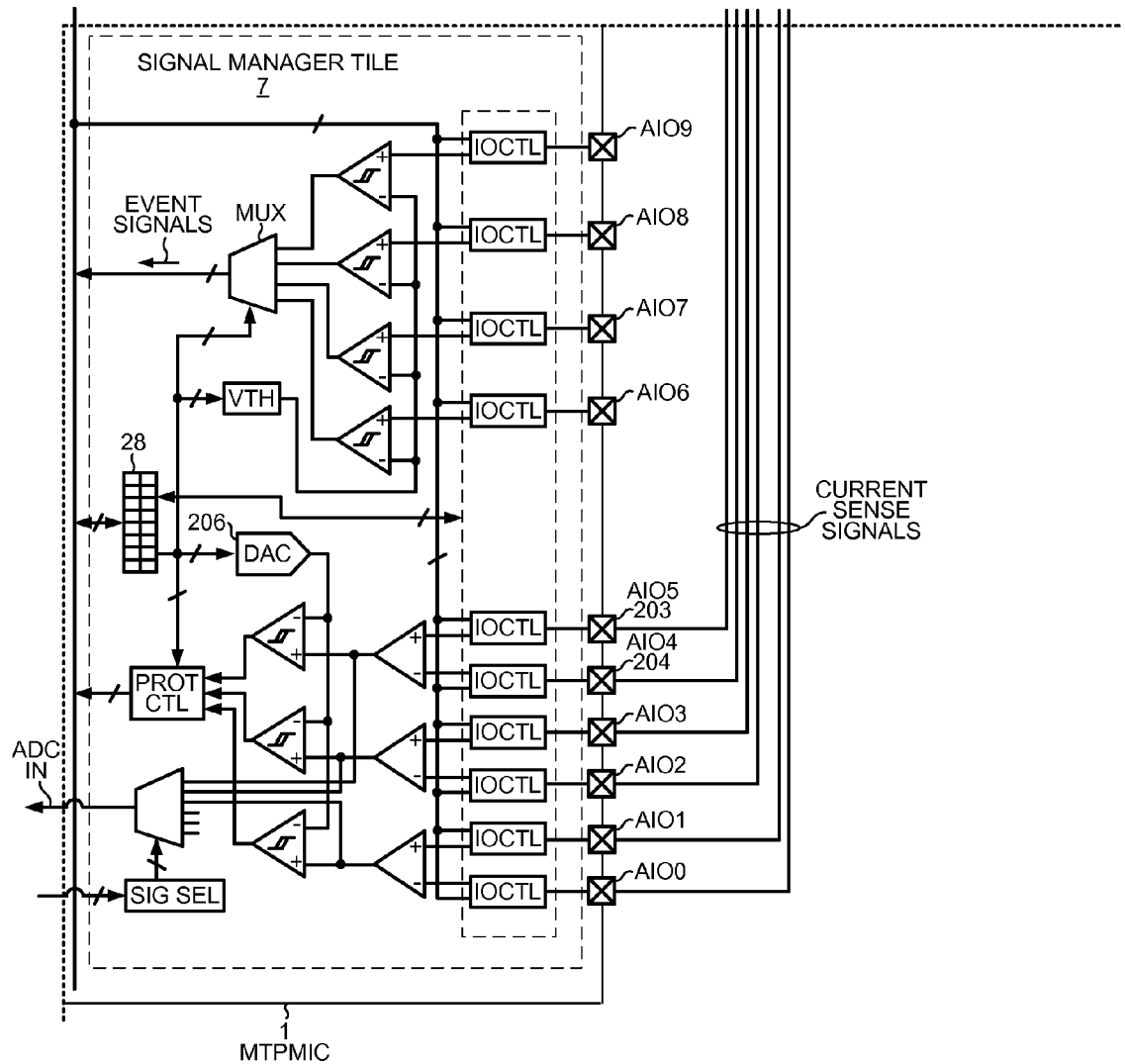

Driver manager tile 450 includes low-side drivers 451-453, and high-side drivers 454-456. Each of the high-side drivers 454-456 includes a metal option connection to the supply voltage VP and a metal option connection to ground, as shown in FIG. 10C. Because the high-side drivers 454-456 are configured to operate as low-side drivers, they are referred to as low-side drivers 454-456. Low-side driver 451 drives terminal LS1 457, low-side driver 452 drives terminal LS2 458, and low-side driver 453 drives terminal LS3 459. Low-side driver 454 drives terminal LS4 460, low-side driver 455 drives terminal LS5 461, and low-side driver 456 drives terminal LS6 462.

Low-side drivers 451-453 are used along with three ultra-high voltage high-side drivers (not shown) to drive the motor 390. The ultra-high voltage high-side drivers are typically part of a separate integrated circuit die that is contained within package 3 along with the MTPMIC 1. The MTPMIC 1 controls and supplies power to the ultra-high voltage high-side drivers within the separate die. The separate die comprising the ultra-high voltage high-side drivers is omitted from FIG. 10 due to space constraints. For additional information on the structure and operation of the separate die including the ultra-high voltage high side-drivers, and how MTPMIC 1 controls the ultra-high voltage high-side drivers along with low-side drivers 451-453 to drive motor 390, see: U.S. patent application Ser. No. 13/669,416, entitled "Power Management Multi-Chip Module With Separate High-Side Driver Integrated Circuit Die," filed Nov. 5, 2012, by Huynh et al. (the entire subject matter of this patent document is incorporated herein by reference).

Low-side drivers 454-456 are used to drive LED lighting 391. The LED lighting 391 includes three strings of LEDs 426, 427 and 428 that are powered from the VBUS supply at node 438 in a step-down topology. A pull-down NFET associated with each LED string is provided to conduct pulses of current through the string. When the NFET is pulsed on current flow through the associated inductor increases, whereas when the NFET is off then current flow through the inductor decreases. The on-time of the NFET is pulse width modulated in order to control the average current drawn through an associated LED string. When the NFET is on, current flows through the LED string, through the inductor, through the NFET, through the current sense resistor, and to ground conductor. In the case of LED string 426, the current sense resistor is resistor 423. A differential amplifier of the signal manager tile and the ADC is used to monitor the magnitude of this current. When the NFET is turned off, current flows through the LED string, through the inductor, and back through the diode to the VBUS conductor 438. Average current flow through the LED string is 100 mA in the present example. The pulse width modulated signal is generated by one of the timers in the MCU/ADC tile. Because there are three LED strings in the example of FIG. 10, three corresponding timers are used.

High Voltage Step Down with Hibernate Mode

Figure 11:
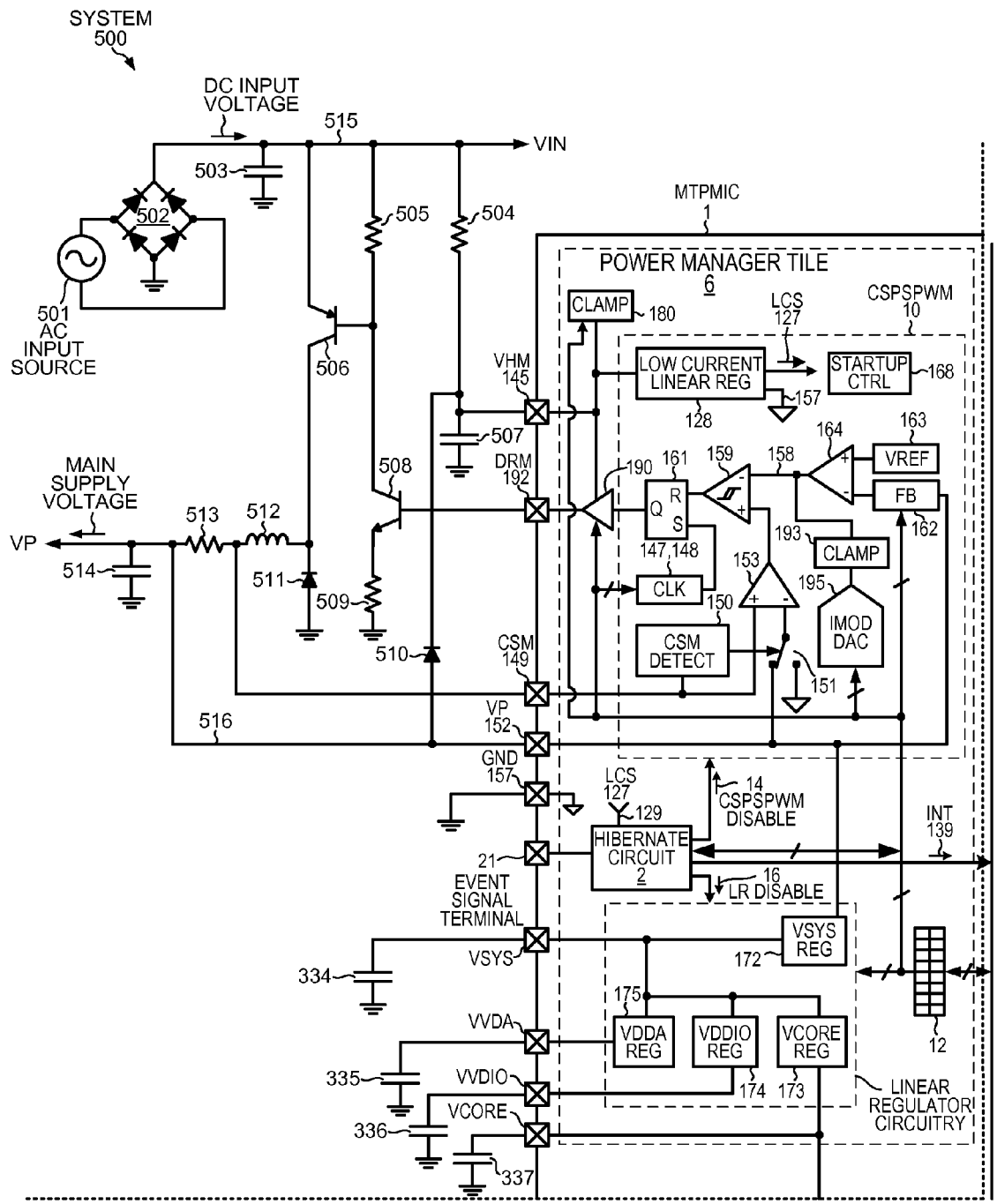
FIG. 11 is a diagram of a system 500 in which the power manager tile and external components form a high voltage step down converter power supply.

FIG. 11 is a diagram of a system 500 that includes MTPMIC 1 and external circuit components 501-514. The power manager tile 6 and the external circuitry 501-514 are configured to form a high voltage step down buck converter. During operation of system 500, hibernate circuit 2 is operable in a hibernate mode that disables the high voltage step down buck converter. In the hibernate mode, MTPMIC 1 is unpowered (except for an amount of circuitry within the hibernate circuit 2 that continues to consume minimal current). The hibernate circuit 2 receives current supply directly from the high voltage input through resistor 504 and through the low current linear regulator 128, allowing the power consumed by system 500 to be less than 30.0 milliwatts in the total hibernate mode.

The power manager tile 6 illustrated in FIG. 11 is a somewhat simplified version of the power manager tile illustrated in FIG. 2. DRM terminal 192 is used to drive an external NPN bipolar transistor 508, which in turn drives a PNP bipolar transistor 506 as a switch. PNP transistor 506 turns on and off to drive inductor 512. Resistor 513 is a current sense resistor. The 12.0 volt VP present on node 516 is a step down voltage generated directly from the high voltage rectified AC input voltage VIN on node 515. The rectified AC input voltage VIN on node 515 in the example of the AC input source 501 being 110 VAC wall power is 150 volts DC.

Flyback with Hibernate Mode

Figure 12:
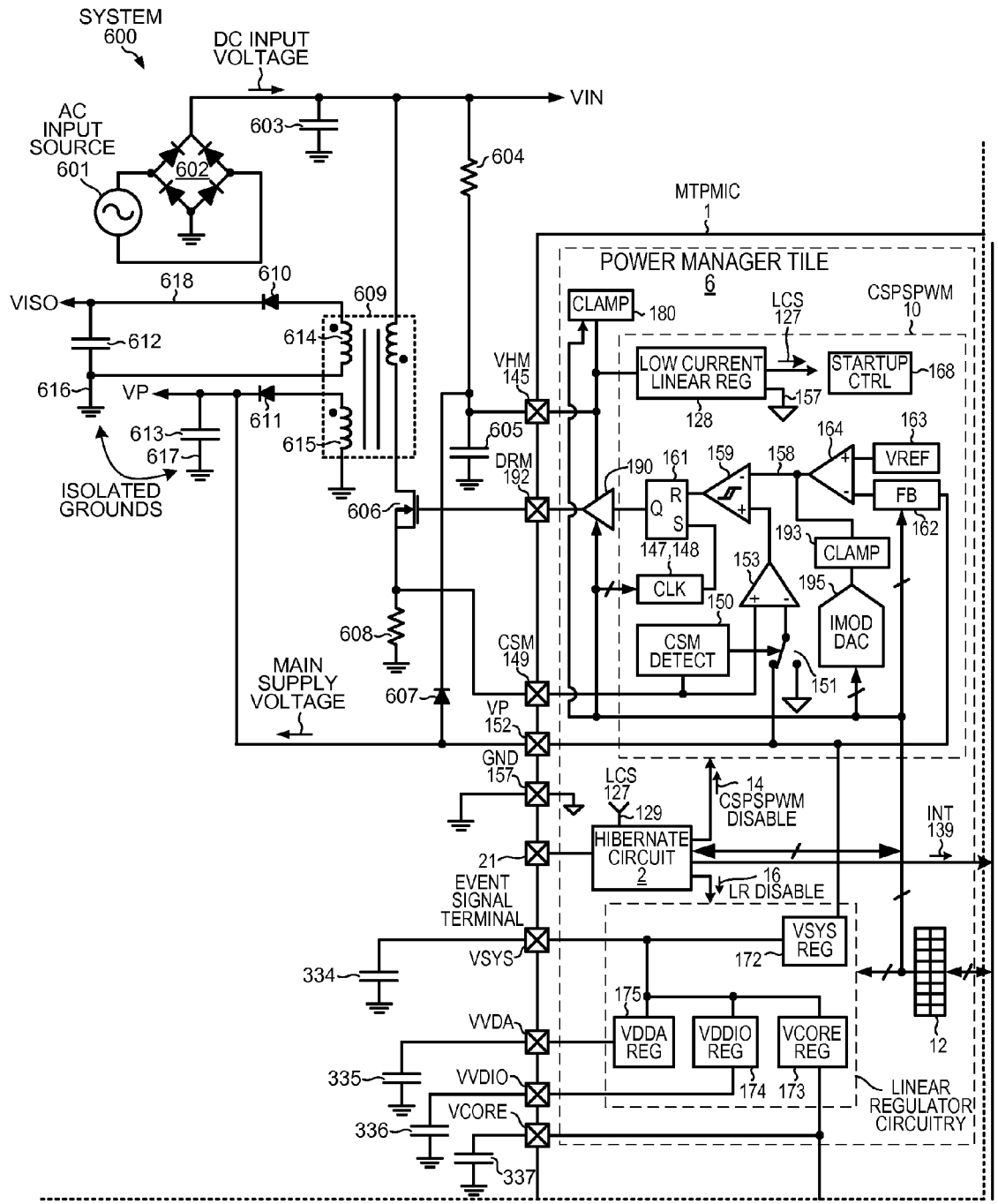
FIG. 12 is a diagram of a system 600 in which the power manager tile and external components form a flyback converter power supply.

FIG. 12 is a diagram of a system 600 that includes MTPMIC 1 and external circuit components 601-613. The power manager tile 6 and external circuit components 601-613 are configured to form a flyback converter. During operation of system 600, the hibernate circuit 2 is operable in a hibernate mode that disables the flyback converter. In the hibernate mode, MTPMIC 1 is unpowered (except for an amount of circuitry within the hibernate circuit 2 that continues to consume minimal current). The hibernate circuit 2 receives current supply directly from the high voltage input through resistor 604 and through the low current linear regulator 128, allowing the power consumed by system 700 to be less than 30.0 milliwatts in the total hibernate mode.

The CSM mode detect block 150 detects a low-side current sense configuration. An external field effect transistor 606 is turned on and off to drive the primary winding of transformer 609. In this example there are two secondary windings 614 and 615. Secondary winding 614 is used to provide an output voltage VISO whose ground is isolated from the ground of secondary winding 615. Ground conductor 616 is isolated from ground conductor 617. Secondary winding 615 is used to provide main supply voltage VP and regulation feedback to the CSPSPWM 10. If the magnitude of the sensed voltage VP is lower than desired, then the CSPSPWM 10 controls the switching of transistor 606 so that its on pulses are of longer duration. If the magnitude of the sensed voltage VP is higher than desired, then the CSPSPWM 10 controls the switching of transistor 606 so that its on pulses are of shorter duration. The internal regulator 128 and the driver 190 initially receive start up power from the VIN voltage through resistor 604 and capacitor 605, until the supply voltage VP has risen and is higher than VHM, at which point the VHM voltage is supplied by VP through diode 607. The output voltage VISO on conductor 618 is related to the main supply voltage VP by the turns ratio between secondary windings 614 and 615.

Method of Powering Up and Configuring

Figure 13A:
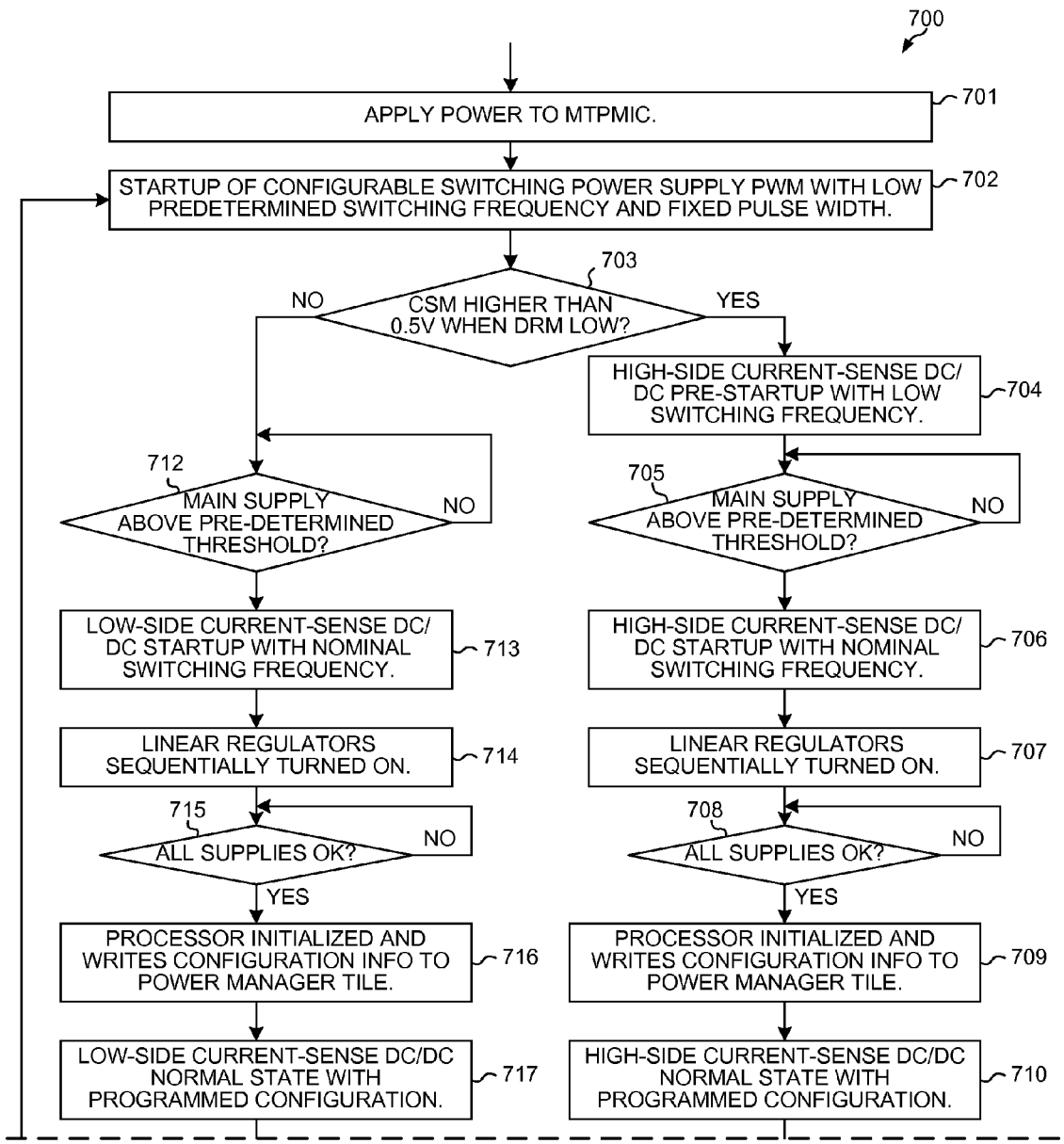
FIG. 13 comprises FIGS. 13A and 13B which together are a flowchart of a method 700 in accordance with one novel aspect.
Figure 13B:
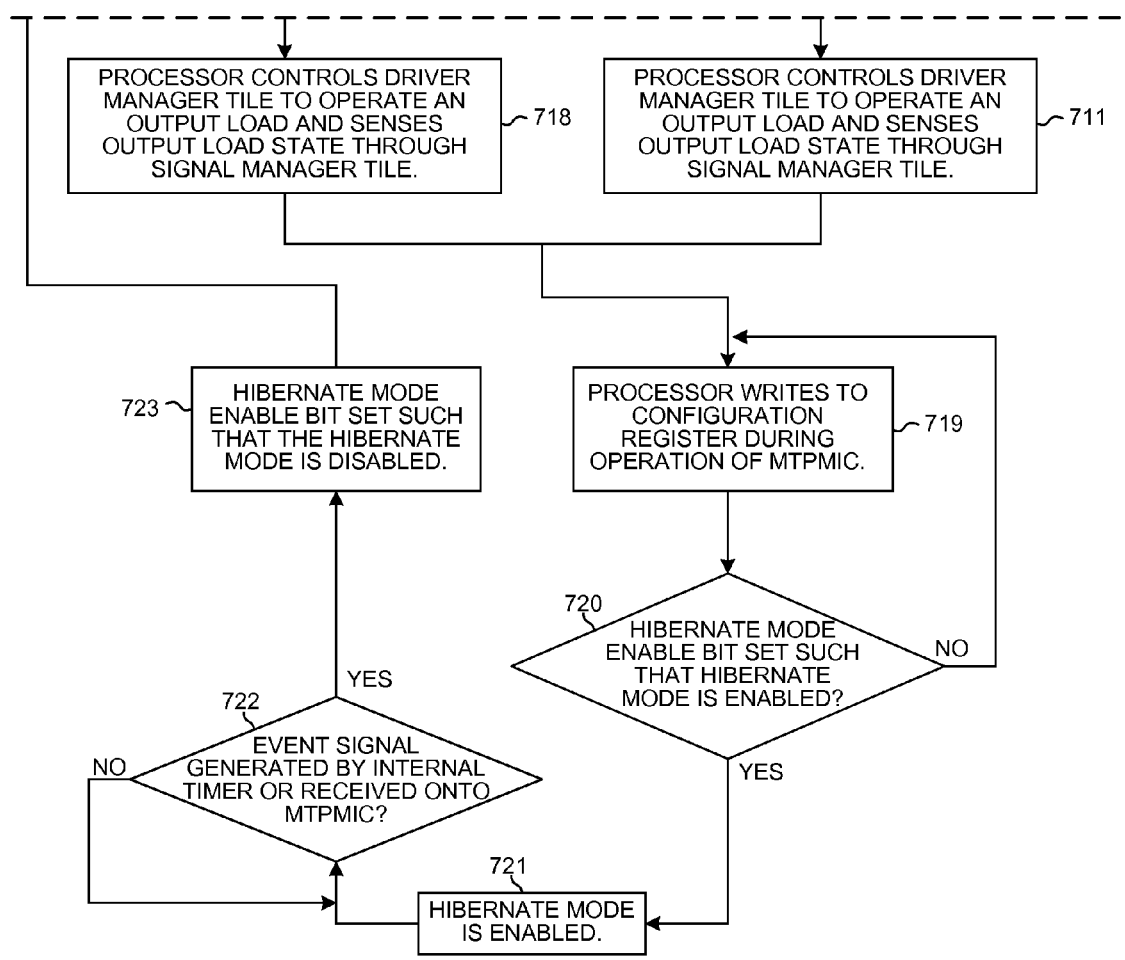

FIG. 13 is a flowchart of a method 700 in accordance with one novel aspect. FIGS. 13A and 13B fit together to form FIG. 13. Power is applied (step 701) to the previously unpowered MTPMIC 1. In one example, the CSPSPWM 10 of the power manager tile 6 along with external circuitry are operable as a switching power supply circuit. The CSPSPWM 10 pulses an external main switch of the switching power supply in a startup safe mode with a fixed predetermined switching frequency and with a fixed pulse width (step 702). The CSM mode detect block 150 determines (step 703) if the voltage on the CSM terminal 149 is higher than 0.5 volts when the voltage on the terminal DRM 192 is being driven to a low level. If the CSM terminal 149 is determined to be higher, then the current sensing circuitry of the CSPSPWM is configured (step 704) for high-side current sense. The main supply voltage VP rises as the switching power supply is pulsed until the main supply voltage VP is determined (step 705) to be above a predetermined threshold voltage. The predetermined threshold voltage may be, for example, 4.3 volts. The switching frequency is then changed to a predetermined switching frequency (step 706) for a normal operating mode of the power supply. The linear regulators are then turned on sequentially (step 707). If all supply voltages are within proper bounds (step 708), then the processor in the MCU/ADC tile is powered up (step 709) from the supply voltage output by one of the linear regulators. The processor is initialized and then writes configuration information (step 710) across the standardized bus to the configuration register of the power manager tile. The processor controls the driver manager tile (step 711) to operate an output load, and the processor controls the signal manager tile to monitor the output load state.

At the decision of step 703, if the CSM terminal 149 is determined to be lower than 0.5 volts when the terminal DRM 192 is driven to a low level, then the current sensing circuitry of the CSPSPWM remains configured for low-side current sense. The main supply voltage VP rises as the switching power supply is pulsed until the main supply voltage VP is determined (step 712) to be above a predetermined threshold voltage. The predetermined threshold voltage may be, for example, 4.3 volts. The switching frequency is then changed to a predetermined switching frequency (step 713) for a normal operating mode of the power supply. The linear regulators are then turned on sequentially (step 714). If all supply voltages are within proper bounds (step 715), then the processor in the MCU/ADC tile is powered up (step 716) from the supply voltage output by one of the linear regulators. The processor is initialized and then writes configuration information (step 717) across the standardized bus to the configuration register of the power manager tile. The processor controls the driver manager tile (step 718) to operate an output load, and the processor controls the signal manager tile to monitor the output load state.

During operation of MTPMIC 1, the processor 13 writes across standardized bus 19 to configuration register 12 of the power manager tile 6 (step 719). If the processor 13 writes to configuration register 12 such that the hibernate mode enable bit is a digital logic high value, then the hibernate mode is enabled (step 720). When the hibernate mode is enabled, hibernate circuit 2 disables the CSPSPWM and linear regulators of the power manager tile 6 causing the circuitry of MTPMIC 1 to be unpowered (step 721). If an event signal is generated by internal timer 18 or if an event signal is received onto even signal terminal 21 of the MTPMIC 1 (step 722), then the hibernate logic block 122 sets the hibernate mode enable bit to a digital logic low value thereby disabling the hibernate mode (step 723). The CSPSPWM 10 pulses an external main switch of the switching power supply in a startup safe mode with a fixed predetermined switching frequency and with a fixed pulse width (step 702).

Although certain specific embodiments are described above for instructional purposes, the teachings of this patent document have general applicability and are not limited to the specific embodiments described above. Although the low current linear regulator 128 is within the CSPSPWM 10 in FIG. 1, in an alternative embodiment the low current linear regulator 128 may be realized as a separate circuit within the power manager tile 6. Accordingly, various modifications, adaptations, and combinations of various features of the described embodiments can be practiced without departing from the scope of the invention as set forth in the claims.

What is claimed is:

1. An integrated circuit comprising:
    a Configurable Switching Power Supply Pulse Width Modulator (CSPSPWM), wherein the CSPSPWM is part of a switching power supply that generates a supply voltage from a power source, and wherein the CSPSPWM includes a low current linear regulator supplied by a current directly from the power source;
    a hibernate circuit, wherein the hibernate circuit includes a timer, and wherein the hibernate circuit is operable in a hibernate mode in which the hibernate circuit disables the CSPSPWM and uses power supplied from the low current linear regulator to power the timer;
    a configuration register, wherein the configuration register has a hibernate mode enable bit; and
    a processor that is powered by the supply voltage generated by the switching power supply, wherein the processor is configured to write to the configuration register thereby causing the hibernate mode enable bit to be set such that the hibernate mode is enabled, and wherein an event signal causes the hibernate mode enable bit to be set such that the hibernate mode is disabled.

2. The integrated circuit of claim 1, wherein the event signal is generated by the timer within the hibernate circuit when the hibernate circuit is configured in a first configuration, and wherein the event signal is received onto the integrated circuit when the hibernate circuit is configured in a second configuration.

3. The integrated circuit of claim 2, further comprising:
    an event signal terminal, wherein the event signal is received onto the integrated circuit via the event signal terminal due to a pressing of a push-button external to the integrated circuit when the hibernate circuit is configured in the second configuration.

4. The integrated circuit of claim 1, wherein the hibernate circuit is configurable in a configuration where the event signal is generated by the timer a selectable amount of time after the hibernate mode is enabled, and wherein the processor configures the selectable amount of time before the hibernate mode is enabled.

5. The integrated circuit of claim 1, wherein the integrated circuit includes a configurable voltage clamp, wherein the configurable voltage clamp limits a voltage present on a low current linear regulator supply conductor.

6. The integrated circuit of claim 1, wherein the low current linear regulator supplies a current that does not exceed three-hundred microamps when the hibernate mode is enabled.

7. The integrated circuit of claim 1, wherein the power source is a rectified Alternating Current (AC) power source, and wherein the rectified AC power source is greater than one-hundred volts.

8. The integrated circuit of claim 1, wherein the power source is a Direct Current (DC) power source, and wherein the DC power source is greater than twenty volts.

9. The integrated circuit of claim 1, wherein the integrated circuit includes at least one high-side driver and at least one low-side driver, and wherein the at least one low-side driver and the at least one high-side driver are used to drive external Field Effect Transistors (FETs).

10. The integrated circuit of claim 1, wherein the CSPSPWM is configurable such that the switching power supply is taken from the group consisting of: a step down converter, a high voltage step down converter, a flyback converter, and a boost converter.

11. The integrated circuit of claim 1, wherein the powering of the processor involves a second linear regulator, wherein the second linear regulator receives the supply voltage from the switching power supply and outputs a second supply voltage supplied to the processor.

12. A method comprising:
    (a) using a Configurable Switching Power Supply Pulse Width Modulator (CSPSPWM) to power a processor, wherein the CSPSPWM is part of a switching power supply that generates a supply voltage from a power source, wherein the processor is powered by the supply voltage generated by the switching power supply, wherein the CSPSPWM includes a low current linear regulator that receives power from the power source and supplies power to a hibernate circuit operable in a hibernate mode, and wherein the hibernate mode is disabled;
    (b) enabling the hibernate mode using the processor, wherein the processor writes to a configuration register having a hibernate mode enable bit, wherein the processor sets the hibernate mode enable bit such that the hibernate mode is enabled, and wherein the enabling of the hibernate mode causes the CSPSPWM to be disabled; and
    (c) disabling the hibernate mode by setting the hibernate mode enable bit such that the hibernate mode is disabled, wherein the disabling of the hibernate mode is triggered by an event signal, and wherein the disabling of the hibernate mode causes the CSPSPWM to be enabled.

13. The method of claim 12, wherein the hibernate circuit is configurable in a first configuration where the event signal is generated by a timer, wherein the hibernate circuit is configurable in a second configuration where the event signal is received onto an integrated circuit via an event signal terminal, and wherein the integrated circuit comprises the CSPSPWM, the processor, the timer, and the hibernate circuit.

14. The method of claim 12, wherein the hibernate circuit is configurable in a configuration where the event signal is generated in the step of (c) by a timer a selectable amount of time after the hibernate mode is enabled in the step of (b), and wherein the processor configures the selectable amount of time before the hibernate mode is enabled in the step of (b).

15. The method of claim 12, wherein a configurable voltage clamp is used to limit a voltage present on a low current linear regulator supply conductor.

16. The method of claim 12, wherein the low current linear regulator supplies a current that does not exceed three-hundred microamps when the hibernate mode is enabled in the step of (b).

17. The method of claim 12, wherein the power source is a rectified Alternating Current (AC) power source, and wherein the rectified AC power source is greater than one-hundred volts.

18. The method of claim 12, wherein the power source is a Direct Current (DC) power source, and wherein the DC power source is greater than twenty volts.

19. The method of claim 12, wherein the CSPSPWM is configurable such that the switching power supply is taken from the group consisting of: a step down converter, a high voltage step down converter, a flyback converter, and a boost converter, and wherein the CSPSPWM is configured by the processor before the step of (a).

20. An integrated circuit comprising:
 a Configurable Switching Power Supply Pulse Width Modulator (CSPSPWM), wherein the CSPSPWM is part of a switching power supply that generates a supply voltage from a power source;
 a processor that is powered by the supply voltage generated by the switching power supply;
 a configuration register, wherein the configuration register has a hibernate mode enable bit; and
 means for disabling and enabling the CSPSPWM, wherein the processor is configured to write to the configuration register thereby setting the hibernate mode enable bit to a first value, wherein the means disables the CSPSPWM when the hibernate mode enable bit is set to the first value, wherein an event signal triggers the hibernate mode enable bit to be set to a second value, and wherein the means enables the CSPSPWM when the hibernate mode enable bit is set to the second value.

21. The integrated circuit of claim 20, wherein the means is a hibernate circuit having a hibernate mode, wherein if the hibernate mode enable bit is set to the first value, then the hibernate mode is enabled and the hibernate circuit disables the CSPSPWM, and wherein if the hibernate mode enable bit is set to the second value, then the hibernate mode is disabled and the hibernate circuit enables the CSPSPWM.

22. The integrated circuit of claim 20, wherein the means is configurable in a first configuration where the event signal is generated by a timer contained within the integrated circuit, and wherein the hibernate circuit is configurable in a second configuration where the event signal is received onto the integrated circuit via an event signal terminal.

\* \* \* \* \*